(12) United States Patent
Almanza-Workman et al.

(10) Patent No.: US 10,073,211 B1
(45) Date of Patent: Sep. 11, 2018

(54) DISPLAY ASSEMBLY WITH AN OPAQUE LAYER

(71) Applicant: Amazon Technologies, Inc., Seattle, WA (US)

(72) Inventors: Angeles Marcia Almanza-Workman, Sunnyvale, CA (US); Carl Philip Taussig, Woodside, CA (US); Isabella Talley Lewis, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/265,369

(22) Filed: Sep. 14, 2016

Related U.S. Application Data

(63) Continuation-in-part of application No. 14/943,897, filed on Nov. 17, 2015, now Pat. No. 9,927,650.

(51) Int. Cl.
*F21V 8/00* (2006.01)

(52) U.S. Cl.
CPC ............ *G02B 6/0055* (2013.01); *G02B 6/005* (2013.01); *G02B 6/0088* (2013.01)

(58) Field of Classification Search
CPC ..... G02B 6/0055; G02B 6/0088; G02B 6/005
See application file for complete search history.

(56) References Cited

U.S. PATENT DOCUMENTS

| 6,079,840 | A | 6/2000 | Ono et al. | |
|---|---|---|---|---|
| 2010/0110334 | A1 | 5/2010 | Oki et al. | |
| 2010/0171705 | A1* | 7/2010 | Lee | G06F 1/1662 345/168 |
| 2015/0277185 | A1 | 10/2015 | Nam et al. | |
| 2015/0301266 | A1 | 10/2015 | Araki et al. | |
| 2015/0331170 | A1 | 11/2015 | Cheng et al. | |
| 2016/0026061 | A1* | 1/2016 | O'Keeffe | G02F 1/167 359/296 |
| 2016/0170130 | A1 | 6/2016 | Jin | |

* cited by examiner

*Primary Examiner* — David V Bruce

(74) *Attorney, Agent, or Firm* — Lowenstein Sandler LLP

(57) ABSTRACT

Displays are described. One display having a light guide, and a multilayer structure. The light guide is disposed on a top side of the reflective display. The multilayer structure is disposed on the light guide. The multilayer structure includes: a first optically clear adhesive (OCA) layer disposed on the light guide; a black ink layer disposed on the first OCA layer; an first layer disposed on the black ink layer; a polymer layer disposed on the first layer; and a second OCA layer disposed on the polymer layer.

20 Claims, 24 Drawing Sheets

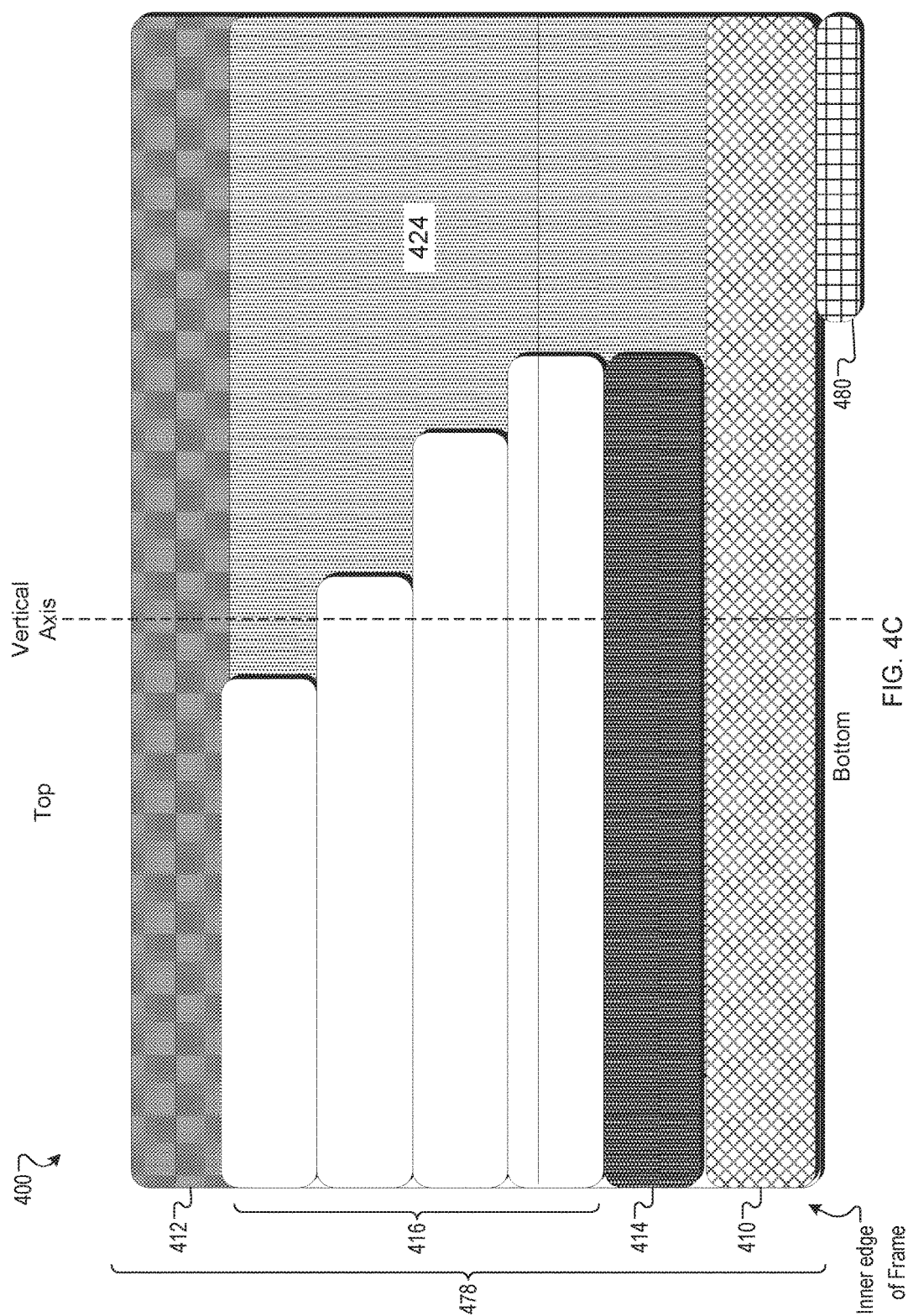

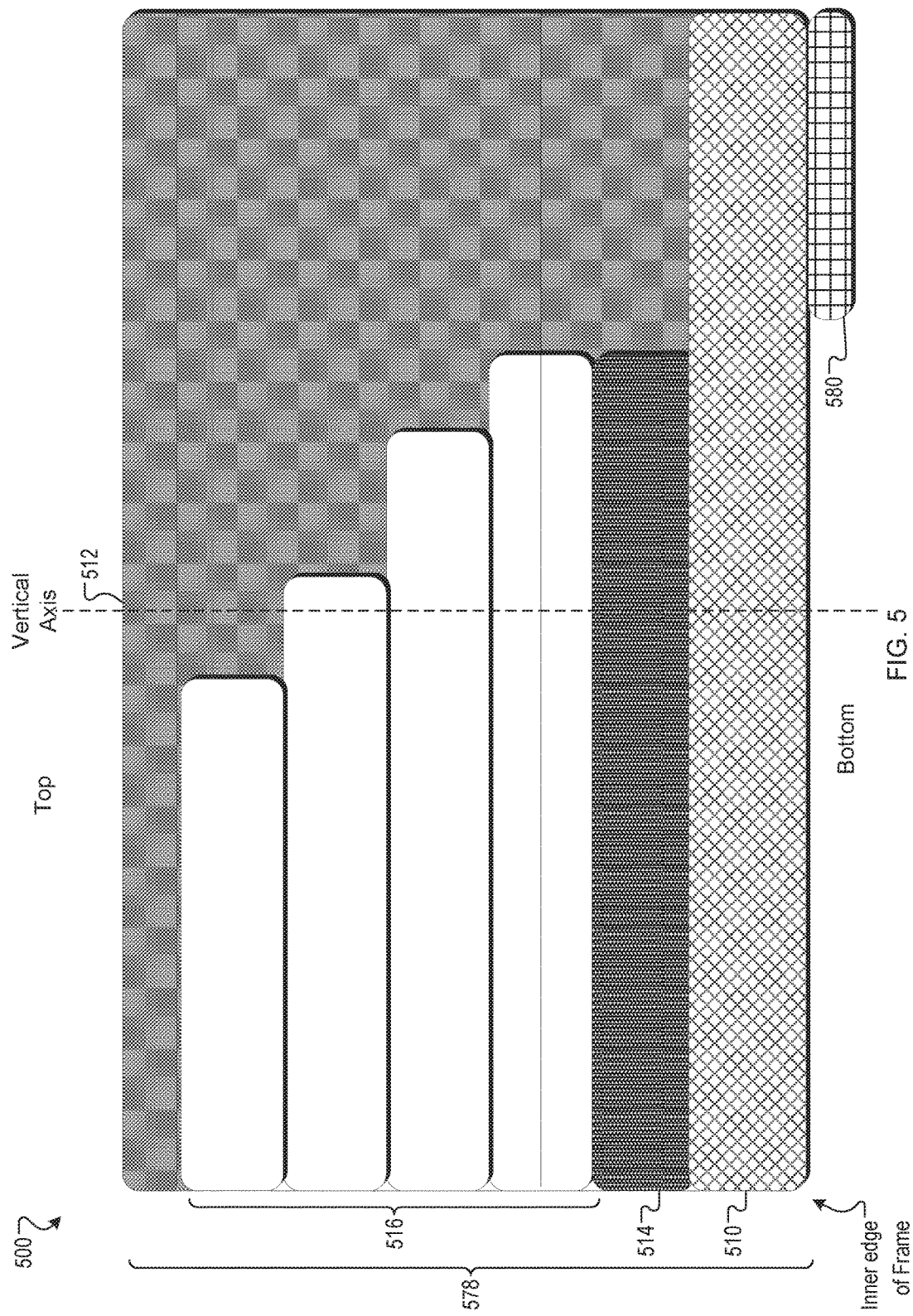

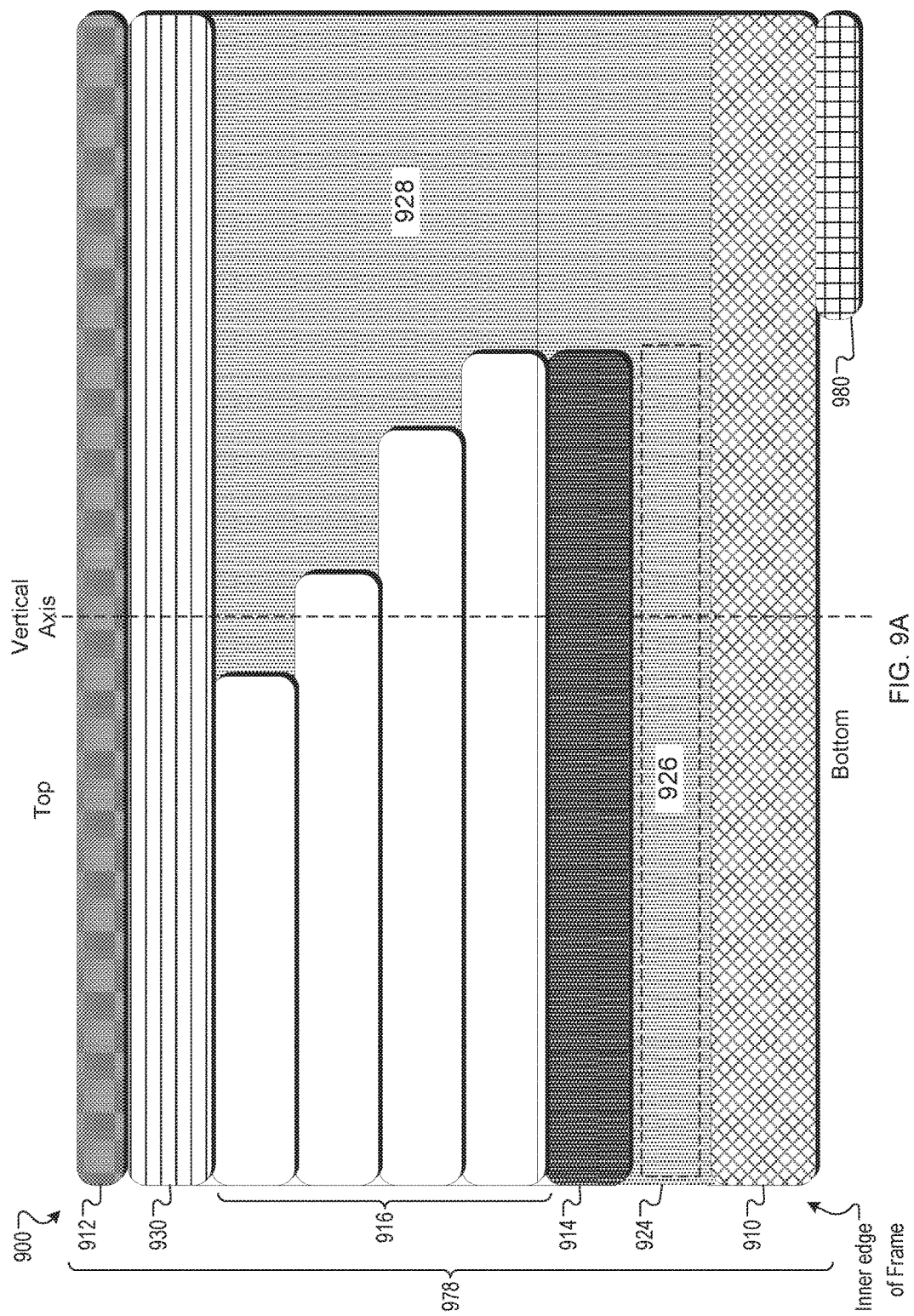

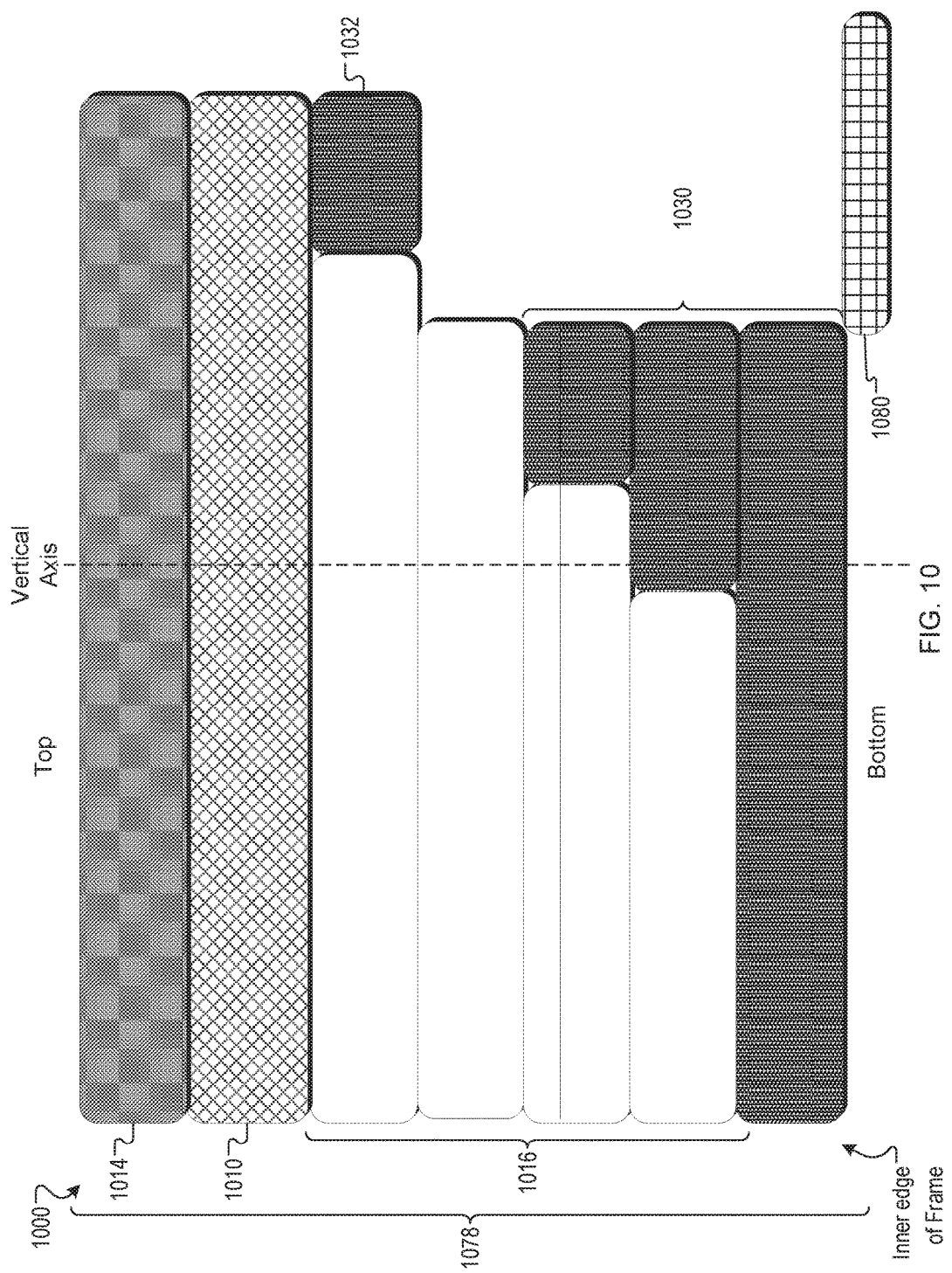

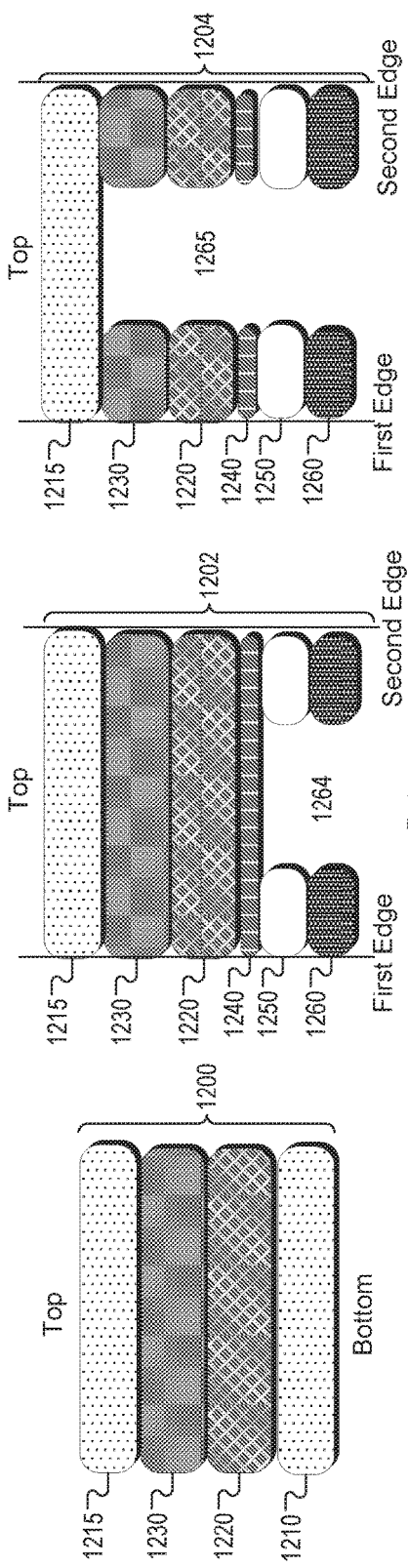
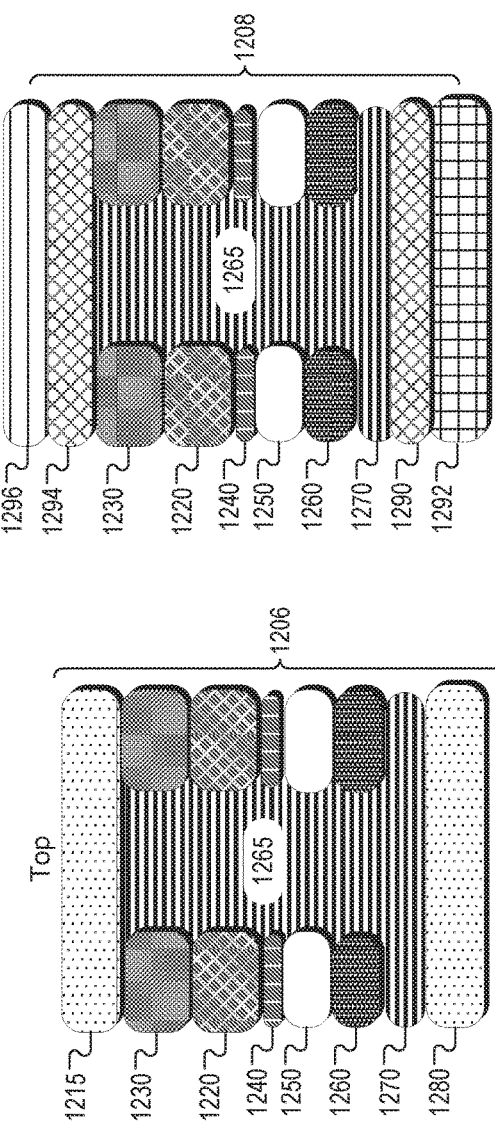

DISPLAY ASSEMBLY WITH AN OPAQUE LAYER

CROSS-REFERENCE TO RELATED APPLICATION

This application is a continuation-in-part of U.S. patent application Ser. No. 14/943,897 filed Nov. 17, 2015. This application is incorporated by reference herein in its entirety.

BACKGROUND

A large and growing population of users is enjoying entertainment through the consumption of digital media items, such as music, movies, images, electronic books, and so on. The users employ various electronic devices to consume such media items. Among these electronic devices are electronic book readers, smart phones, personal digital assistants (PDAs), portable media players, tablet computers, netbooks, laptops, and the like. These electronic devices include displays to enable the consumption of the digital media items. In order to display the digital media items, the electronic device may include displays with display lighting.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 4C illustrates a display assembly with a reflective display, a lens, an antiglare layer, a black ink layer, a set of white ink layers, and a planarization layer according to one embodiment.

FIG. 5 illustrates a display assembly with a reflective display screen, a lens, a black ink layer, set of white ink layers, and an antiglare layer that covers the black ink layer and the set of white ink layers according to one embodiment.

FIG. 9A illustrates a display assembly with a reflective display, a lens or film, an optically clear adhesive (OCA) layer, a black ink layer, a set of white ink layers, a film, and an antiglare layer according to one embodiment.

FIG. 10 illustrates a display assembly with a reflective display, an antiglare layer, a lens, a set of white ink layers, a first black ink layer, and a second black ink layer according to one embodiment.

FIG. 12A illustrates a first step in the fabrication process of the display assembly in FIG. 11 according to one embodiment.

FIG. 12B illustrates the next step in the fabrication process to form stack according to one embodiment.

FIG. 12C illustrates the next step in the fabrication process to form stack according to one embodiment.

FIG. 12D illustrates the next step in the fabrication process to form stack according to one embodiment.

FIG. 12E illustrates the final step in the fabrication process to form stack according to one embodiment.

DETAILED DESCRIPTION

Figure 1:
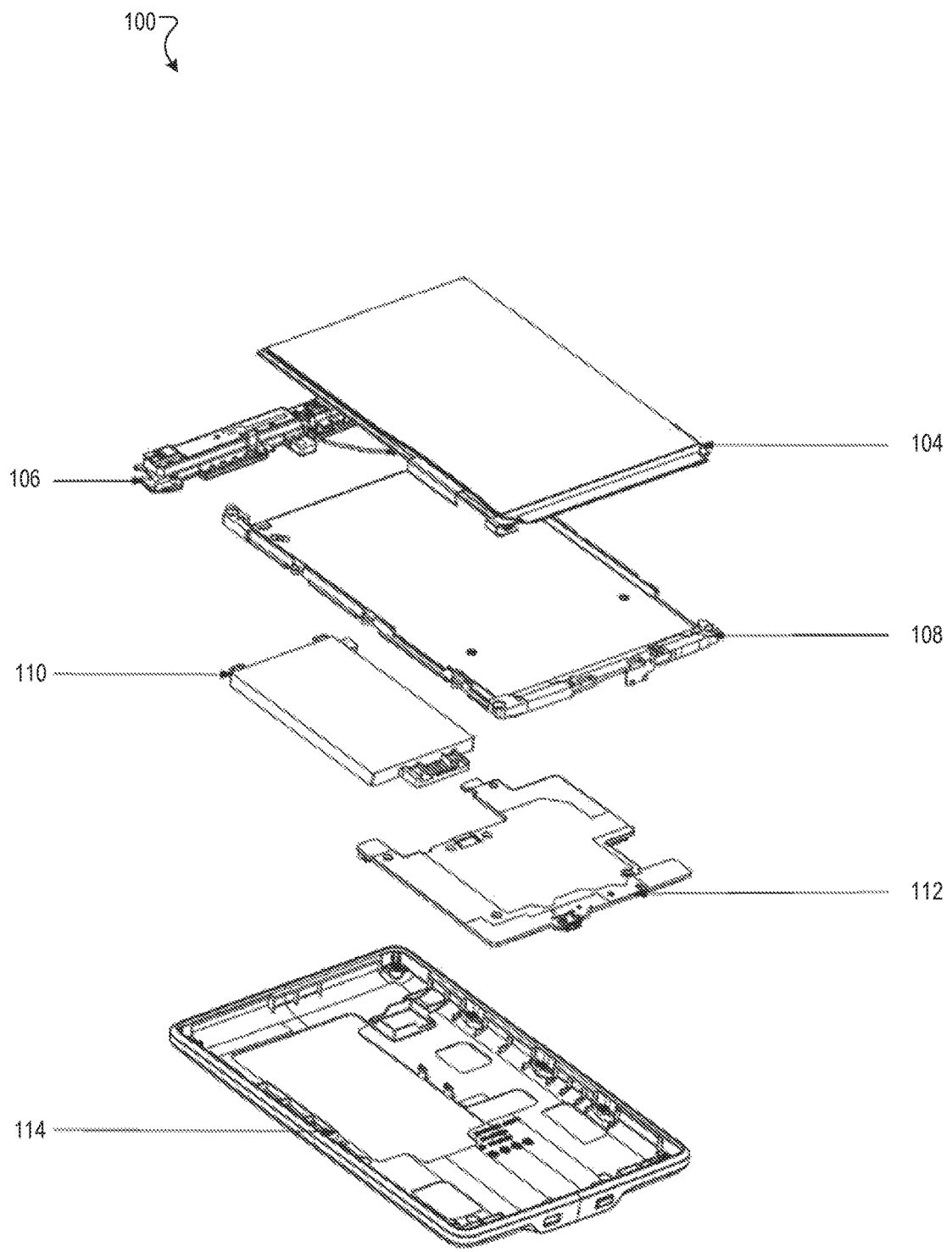
FIG. 1 illustrates an exploded view of an electronic device having a display assembly, including a light source, light guide layer, and a reflective display that is housed in a frame according to one embodiment.

Displays on many industrial, professional, and consumer devices include an illumination technology to enable users to view the display in low-light environments. Conventional light emitting diode (LED) displays may use back-lit display technology such as liquid crystal display (LCD) panels. The back-lit display technology may use an array of LEDs behind the screen.

In contrast to back-lit display technology, e.g., LCD panels, reflective displays (such as an electrophoretic display) are not back-lit. Reflective displays use light reflected off a surface of the display to illuminate the screen. By using reflective display technology, the display of electronic device may have an electronic paper display that simulates or closely mimics an appearance of paper or a printed paper document. For example, reflective displays use incident light to form an image. This incident light may be provided by the sun, general illumination in the room, a reading light, a front light, and so forth. Some example types of reflective displays include bi-stable LCDs, micro-electro-chemical systems (MEMS), electrowetting technology, cholesteric technology, interferometric technology, pigmented electrophoretic technology, and so forth. The reflective display may include color, black and white, or grayscale displays. An electronic paper display or electronic ink (E-ink) display may be a high-resolution display, such as 150 dots per inch (DPI) or greater, and may display text or images even when little or no power is supplied to the display (i.e., bi-stable).

Typically, reflective displays may have various configurations for different lighting environments. For example, reflective displays configured for daytime use or normal lighting environments rely on external light sources and do not include an integrated source for illumination. An electronic device that is configured for the daytime or normal lighting environments may use an external light source to illuminate the reflective display. In another example, reflective displays that are configured for low-light environments or no-light environments include an integrated light source for illumination. For reflective displays that include the integrated light source, the integrated light source is disposed on the display, e.g., on a side of the reflective display that faces a user reading or viewing the reflective display. The integrated light source emits light into a light guide above the display layer.

The integrated light source may be located at one or more edges of the reflective display, i.e., an edge-lit reflective display. The light guide of the edge-lit reflective display reflects light, from the one or more edges of the reflective display, uniformly across the surface of the reflective display. Conventionally, because the light source is brightest near the integrated light source, conventional edge-lit reflective displays have poor uniformity of light across the display surface or a dimly lit display. Additionally, light from the light guide reflects off the reflective display toward a lens of the display. The lens reflects the light and creates a glow or brighter area around the edges of the reflective display, such as at an edge of the display that is located opposite the light source. In particular, the lens may have multiple layers of white ink and light from the light guide reflects off the reflective display toward the lens where recycled reflections create a glow on the reflective white ink. The glow on the reflective white ink is especially noticeable in low light environments, where one or more edges of the reflective display appear to glow brighter than other edges of the reflective display.

The embodiments described herein address the above-noted deficiencies by using an opaque layer in the reflective display to absorb the light reflected back by the lens. For example, the opaque layer may be a black ink layer or an aluminum layer that absorbs the light reflected back by a lens. In another example, the opaque layer may be a black ink layer or an aluminum layer that blocks the light from reaching the top surface of the lens. In another example, the black ink layer or the aluminum layer is adjacent a top surface of the lens. In one example, the aluminum layer has a low transmission that doesn't allow light going through it. The aluminum layer may reflect the light at an angle that illuminates the reflective display. In another embodiment, the aluminum layer may disperse the light and does not illuminate an edge of the lens. In one embodiment, an illuminated reflective display may include a light guide overlayed on top of the reflective display or above the reflective display. Other layers, such as a touch sensitive layer (e.g., a capacitive sensor layer) for detecting touch input or an adhesive layer, may reside above, below, or between the light guide and the reflective display. The embodiments that use an opaque layer may cause the reflective display to not glow around an edge of the display. The opaque layer improves a user experience with the electronic device. The embodiments described herein may produce a bright display without dim spots on the display of glowing edges that are distracting to a user.

FIG. 1 illustrates an exploded view of an electronic device 100 having a display assembly 104, including a light source, light guide layer, and a reflective display that is housed in a frame 108 according to one embodiment. The light guide layer may be optically coupled to the light source, and above the reflective display. In one embodiment, the light source may include a light-emitting diode (LED) with the light guide layer propagating light from the LED through the light guide layer. In another embodiment, the light source may include an incandescent bulb with the light guide layer propagating light from the incandescent bulb through the light guide layer.

The outer housing 114 includes a cavity into which some of the other components are placed, such as a battery 110 and a circuit board 112 or other electronic components 106. The frame 108 may be flat on the top side to accommodate the display assembly 104 and may be shaped on the bottom side to fit around and provide a space for the battery 110 and the circuit board 112. When the battery 110, the circuit board 112, the other electronic components 106, the display assembly 104, and the frame 108 are assembled in the outer housing 114.

The frame 108 may maintain contact and the relative position of the light guide layer and the light source such that light emitted from the light source propagates through the light guide layer to illuminate the reflective display. The frame 108 may include a flat region for a display layer, the light guide layer, the light source, and any other components that make up the display assembly 104. The display assembly 104 may also have a light guard cover that includes one or a combination of a lens; an opaque layer; a white ink layer; and an antiglare layer. The frame 108 may include a fastening point for fastening the frame 108 to the outer housing 114.

Figure 2A:
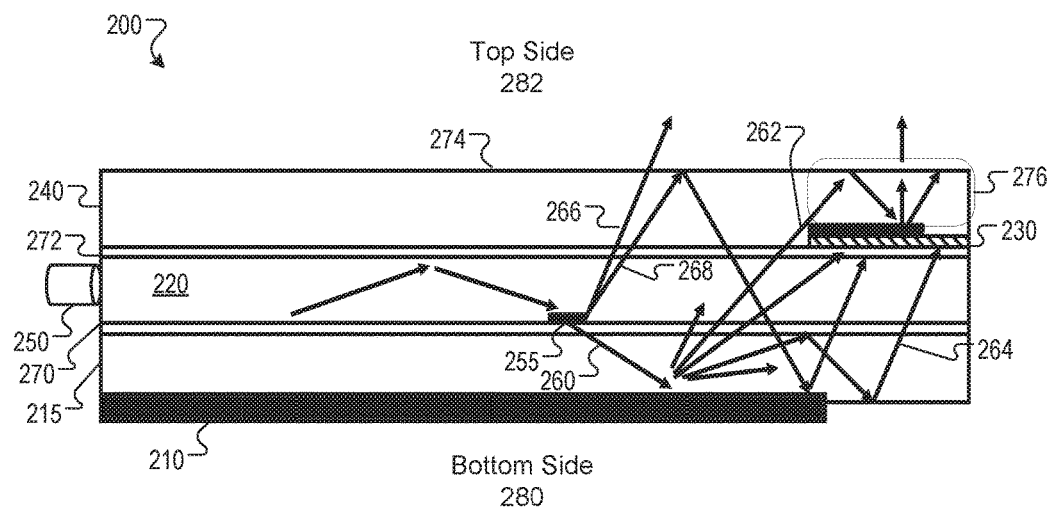
FIG. 2A illustrates a display assembly with a reflective display, a glass substrate, a light guide, a white ink, and a lens according to one embodiment.

FIG. 2A illustrates a display assembly 200 with a reflective display 210, a glass substrate 215, a light guide 220, a white ink 230, and a lens 240 according to one embodiment. The reflective display 210 may be an electronic paper display (EPD) that is an electrically-charged surface that simulates a look of ink on paper. The reflective display 210 uses a movement of electrically charged molecules in an electric field (electrophoresis) to display media content, such as text, pictures, video, and so forth. In one example, the electrically charged molecules may be known as electric ink or E-ink. The E-ink uses positively charged white particles (white ink) and negatively charged black particles (black ink) suspended in a clear encapsulated fluid. In one example, the white ink is titanium oxide. In another example, the black ink is carbon black. To form an electronic display, the encapsulated inks may be printed onto a sheet of plastic film that is laminated to a layer of circuitry. The circuitry forms a pattern of pixels that may be controlled by a display driver.

In one embodiment, when a negative electric field is applied to the circuitry, the negative electric field pushes white ink (such as titanium oxide) to a top layer of the display where the white ink is visible to the user. When the white ink is at the top layer, the surface of the display appears white at that location. In another embodiment when a positive electric field is applied to the circuitry, the positive electric field pulls the black ink to a bottom layer of the display, where the black ink is not viewable. Alternatively, the negative electric field may be applied to push black ink to the top layer and the positive electric field may be applied to pull white ink to the bottom layer, where black ink appears at the location on the screen where the electric fields are applied. The reflective display 210 may be incorporated into electronic devices such as electronic newspapers (eNewspapers), smart cards, electronic shelf labels, transportation signage, electric book (eBook) reader or tablet computer screens, smartphone screens, and so forth.

The reflective display 210 may be located on a bottom side 280 of the display assembly 200. The bottom side 280 is a side of the display assembly that faces an interior of an electronic device housing, e.g., away from a user. The reflective display 210 may be coupled to a glass substrate 215 that is located on top of the reflective display 210. In one example, the glass substrate 215 is a glass that covers the reflective display to protect the display during use. In another example, the glass substrate 215 is part of a touchscreen assembly. In this example, the glass substrate 215 is a glass panel coated with transparent conductive indium tin oxide (ITO) coating that is evenly distributed over both sides of a glass substrate. An electrode pattern is printed around the perimeter of the glass substrate 215 to accurately generate an alternating current over the top conductive layer. The touch of a conductive probe draws the current to the specific point of contact on the glass substrate 215.

The glass substrate 215 may be coupled to the light guide 220 that is located above the glass substrate 215. The glass substrate 215 may be coupled to the light guide 220 with a first adhesive 270. The light guide 220 may be coupled to the lens 240 that is located above the light guide 220. The light guide 220 may be coupled to the lens 240 with a second adhesive 272. The lens 240 may have a top surface 274 facing the top side 282. In one embodiment, a light source 250 may be coupled to the light guide 220. The light guide 220 may diffuse 255 the light from the light source 250 across a surface of the reflective display 210. A first portion of the light 260 diffused from the light guide 220 may be diffused toward a surface of the reflective display 210 to illuminate the reflective display 210. The first portion of the light 260 may be reflected off the reflective display 210 in multiple directions. A second portion of the light 262 may be reflected off the reflective display 210 towards a user and may be emitted by the lens 240. In one example, the second portion of the light 262 may be emitted directly from the reflective display 210 towards a user via the lens 240. In one example, the white ink 230 is embedded into the lens 240. In another example, the white ink 230 is a layer of white ink applied to the top surface of the lens 240. The second portion of light 262 will reflect off the top surface 274 of the lens 240 and back to the white ink 230 when a total internal reflection (TIR) angle of the second portion of light 262 is above a total internal reflection (TIR) angle threshold. In this example, the second portion of the light 262 will reflect off the white ink 230 towards a viewer. In one example, the TIR angle threshold is approximately a 45-degree angle in the top glass. When the second portion of light 262 is reflected off the white ink 230, the reflection may create a glow zone 276 where recycled reflections create a glowing or brighter portion on the white ink 230.

For example, the second portion of the light 262 that reflects off the reflective display 210 may further be reflected back from the lens 240 and may get trapped between the lens 240 and the white ink 230 causing a location of the display with the white ink to glow or shine brighter than other locations on the screen. The glow of the white ink is from recycled light reflecting off the white ink. In one example, a border of the display may appear to be glowing where the second portion of light 262 is incident.

A third portion of the light 264 may be reflected off the reflective display 210 towards the white ink 230 (directly or indirectly). A fourth portion of the light 266 may be emitted from the light guide 220 towards the user and may be emitted by the lens 240. A fifth portion of the light 268 may be reflected by the lens 240 back towards the reflective display 210.

Figure 2B:
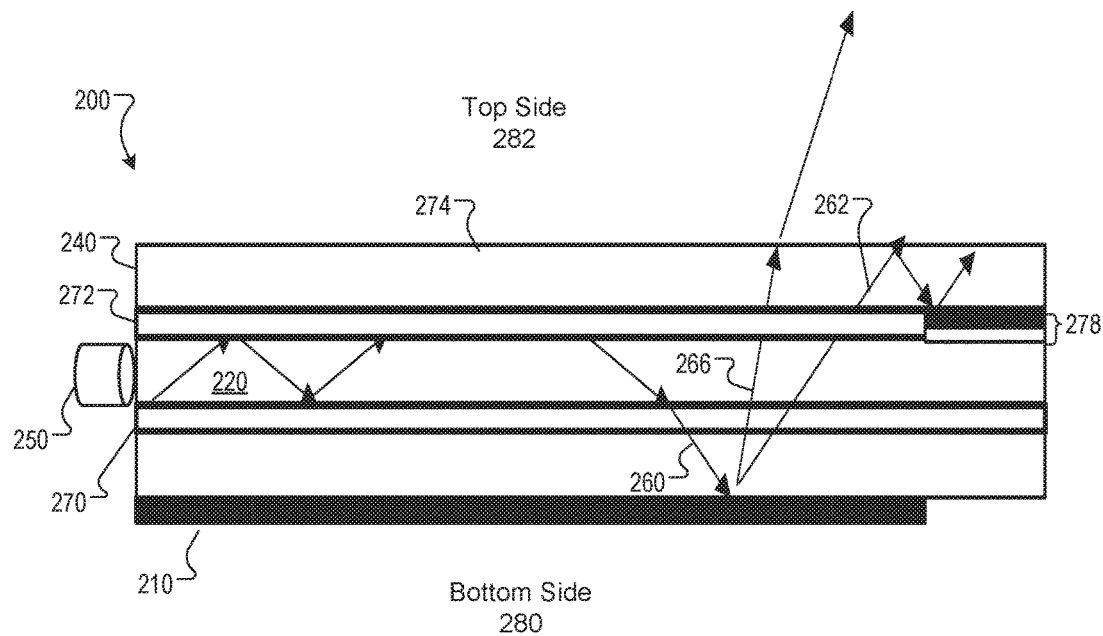
FIG. 2B illustrates a display assembly with a display, a light guide, a lens, and a no-glow portion according to one embodiment.

FIG. 2B illustrates a display assembly 200 with a display (reflective display) 210, a light guide 220, a lens 240, and a no-glow portion 278 according to one embodiment. Some of the features in FIG. 2B are the same or similar to some of the features in FIG. 2A as noted by same reference numbers, unless expressly described otherwise. The no-glow portion 278 is the may include a multilayer structure, as discussed below in greater detail. The no-glow portion 278 may absorb or reflect the second portion of the light 262 to decrease or eliminate a glow or brighter portion for the reflective display 210. The no-glow portion 278 may include a variety of different configurations with different layers or materials as discussed in greater detail in the proceeding paragraphs. One advantage of the no-glow portion 278 is to reduce light emitted around one or more edges of the reflective display to an acceptable level. In one example, an acceptable level may be a level of light around the edges of the reflective display that is approximately a uniform brightness with light emitted across the remaining surface of the display 210 (e.g., the light is not brighter at the edges of the reflective display). In another example, the acceptable level may be a uniform brightness around the edges of the display assembly. In another example, the acceptable level may be a brightness level of the display that is below a threshold value. In another example, the acceptable level of the glow increases or decreases as an environment changes.

Figure 2C:
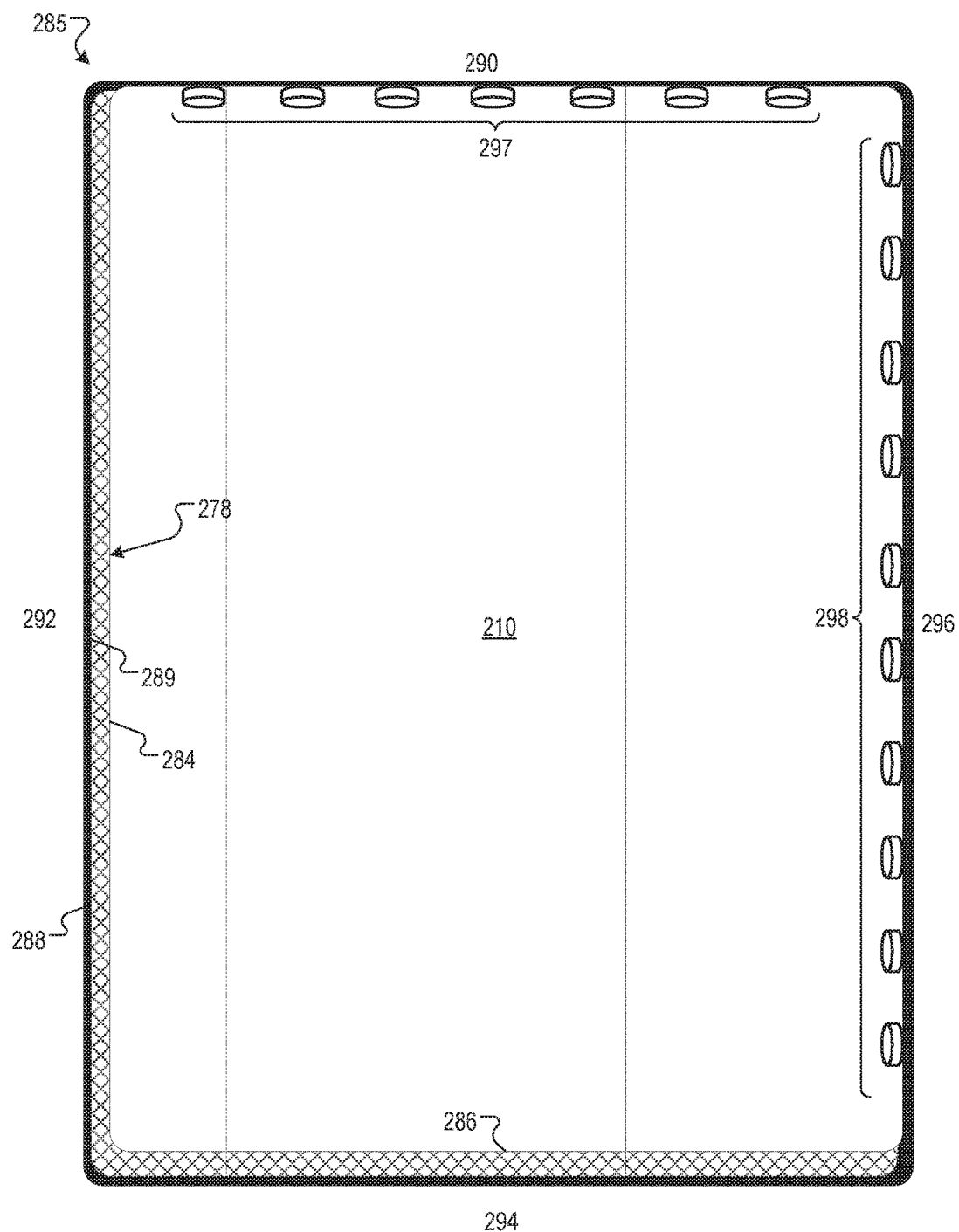
FIG. 2C illustrates an electronic device with a reflective display screen, light sources, and a no-glow portion according to one embodiment.

FIG. 2C illustrates an electronic device 285 with a reflective display screen 210, light sources 297 or 298, and a no-glow portion 278 according to one embodiment. A housing of the electronic device 285 may have a first side 290, a second side 292, a third side 294, and a fourth side 296. The reflective display screen 210 may cover an inner area of the first side 290 of the electronic device 285. In one embodiment, the reflective display screen 210 may be a borderless display with a relatively thin bezel or no bezel. For example, the reflective display screen 210 may have a frame 288 around an outer edge of the reflective display screen 210 without a bezel.

In one embodiment, the no-glow portion 278 may be disposed around an outer border or edge the reflective display screen 210. The no-glow portion 278 may be coplanar with a portion of the frame 288 that encloses the reflective display screen 210. The no-glow portion 278 may be adjacent to the portion of the frame 288 that encloses the reflective display screen 210 (e.g., abutting against an inner edge 289 of the frame 288 on one or more sides of the electronic device 285). For example, a first portion 284 of the no-glow portion 278 may be disposed between an outer edge of the reflective display screen 210 and the inner edge 289 of the frame 288 on the second side 292 of the electronic device 285. In another example, the no-glow portion 278 may cover a dead zone of the reflective display screen 210 (as discussed in greater detail in the proceeding paragraphs). In another example, a second portion 286 of the no-glow portion 278 may be disposed between an outer edge of the reflective display screen 210 and the inner edge 289 of the frame 288 on the third side 294 of the electronic device 285. The no-glow portion 278 may be located along one or more side of the electronic device 285 to block reflective light from glowing along an edge of the reflective display screen 210. In one example, the light may be reflected off the reflective display screen 210 on a side opposite light sources 297 or 298, such as light emitting diodes (LEDs) or incandescent lights. In one embodiment, the first portion 284 may be on an opposite side of light source 297 to reduce or eliminate the light from the light source 297 that is reflected off the reflective display screen 210. In another embodiment, the second portion 286 may be on an opposite side of light source 298 to reduce or eliminate the light from the light source 298 that is reflected off the reflective display screen 210.

One advantage of the no-glow portion 278 may be to reduce or eliminate a glow around one or more edges of the reflective display screen 210. In another example, the no-glow portion 278 may appear to a user to be a continuous portion of the reflective display screen 210 with a white ink layer that matches a color of reflective display screen 210. Another advantage of the no-glow portion 278 matching the reflective display screen 210 may be to provide an appearance of a continuous display screen without an edge of the electronic display screen 210 glowing.

Figure 2D:
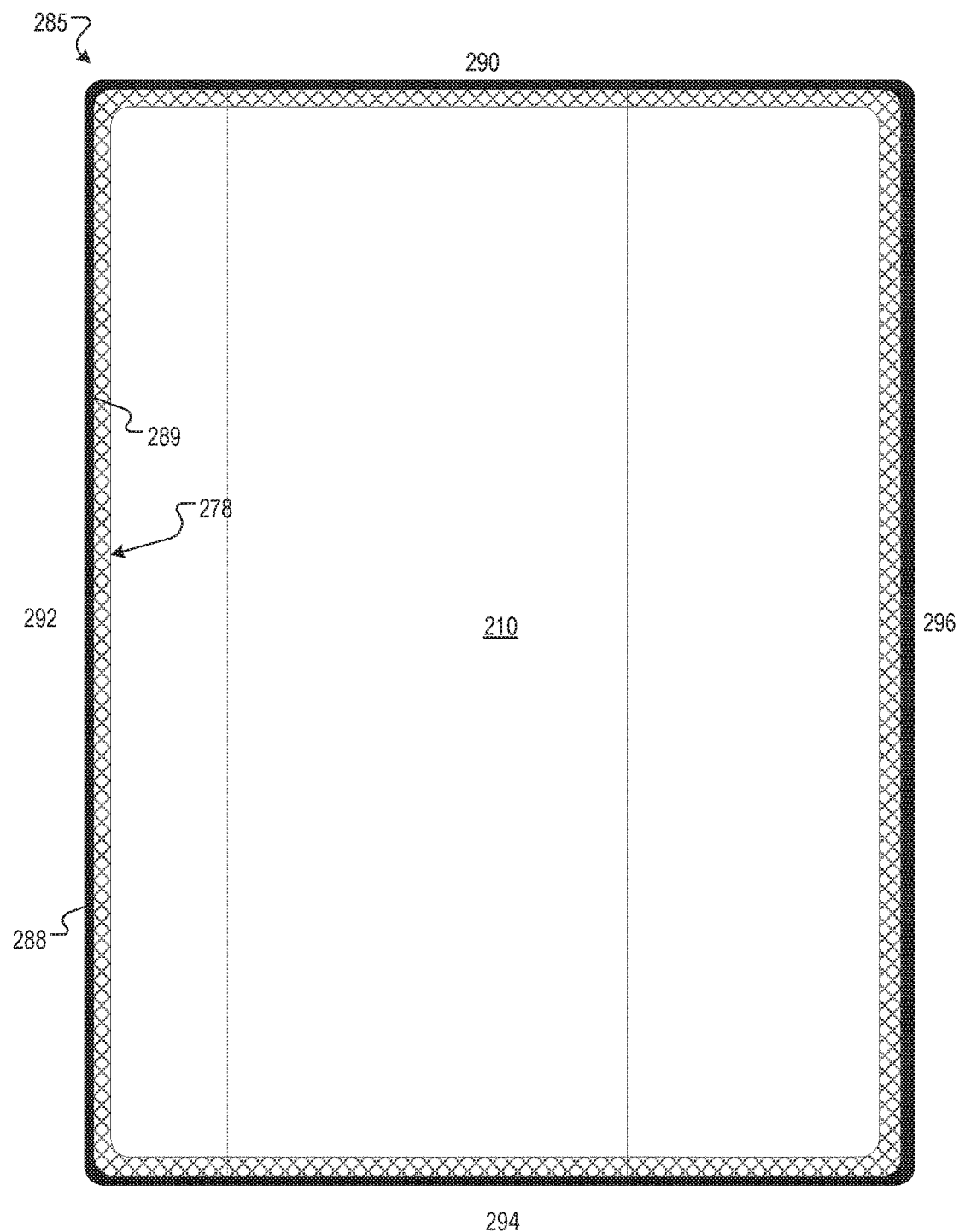
FIG. 2D illustrates an electronic device with a reflective display screen and a no-glow portion according to one embodiment

FIG. 2D illustrates an electronic device 285 with a reflective display screen 210 and a no-glow portion 278 according to one embodiment. The reference numbers in FIG. 2D may have the same numbers as in FIG. 2C to indicate the same or similar features or components as shown in FIG. 2C. However, the features or components of FIG. 2C are not intended to be limiting and other features or components may be used. In one embodiment, the no-glow portion 278 may be disposed around an outer border or edge the reflective display screen 210 and abut against an inner edge 289 of the frame 288 on the first side 290, the second side 292, the third side 294, and the fourth side 296 of the electronic device 285. The no-glow portion 278 may be located along the first side 290, the second side 292, the third side 294, and the fourth side 296 of the electronic device 285 to block reflective light from glowing along the edges of the reflective display screen 210. One advantage of the no-glow portion 278 along the first side 290, the second side 292, the third side 294, and the fourth side 296 of the electronic device 285 may be to reduce or eliminate a glow around the edges of the reflective display screen 210. Another advantage of the no-glow portion 278 along the first side 290, the second side 292, the third side 294, and the fourth side 296 of the electronic device 285 may be to provide an even lighting along the border reflective display screen 210.

Figure 3:
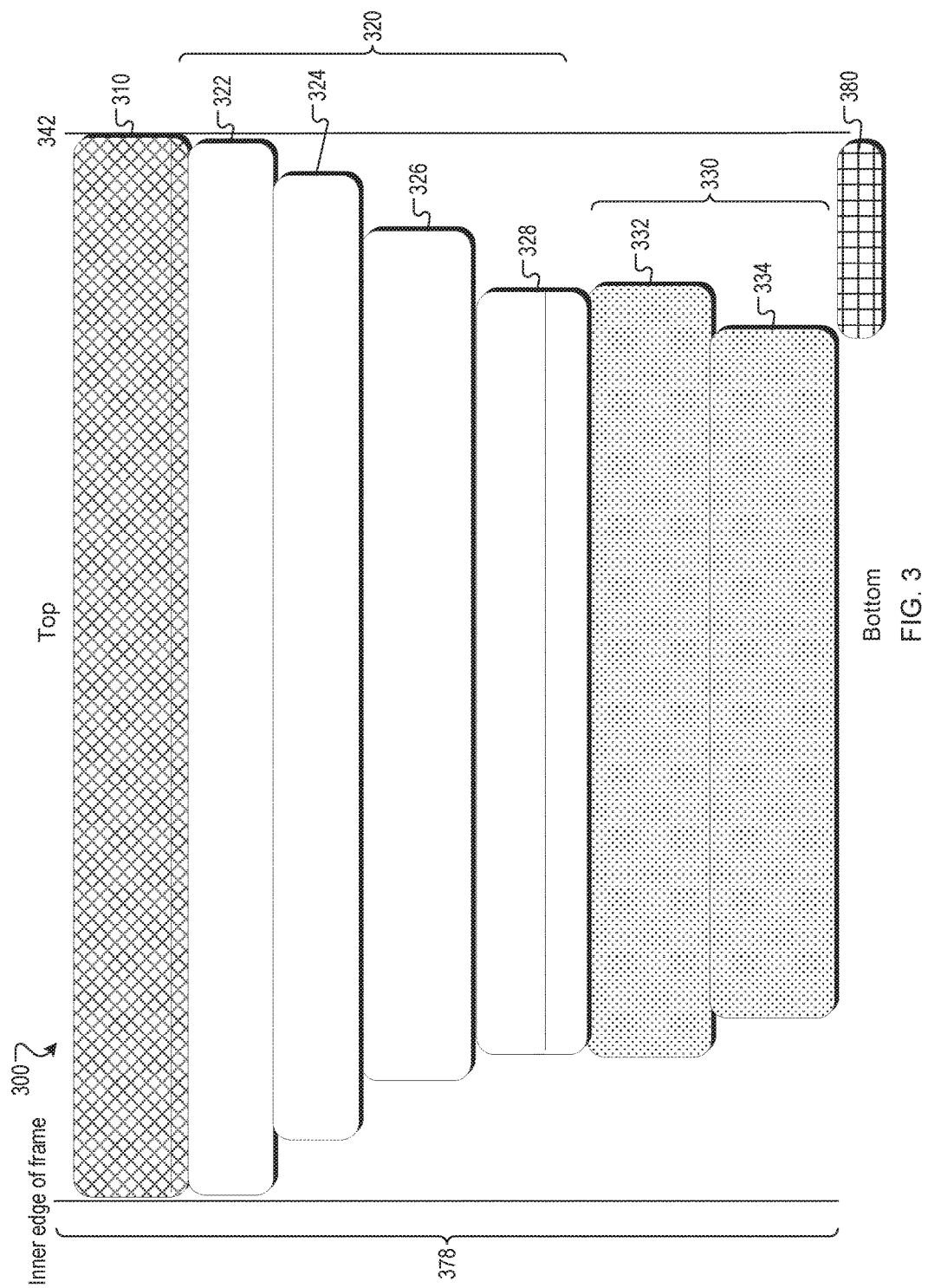
FIG. 3 illustrates a display assembly with a glass layer, a set of white ink layers, and a set of black ink layers according to one embodiment.

FIG. 3 illustrates a display assembly 300 with a glass layer 310, a set of white ink layers 320, a reflective display 380, and a set of opaque layers 330 according to one embodiment. In one example, the set of opaque layers 330 includes multiple black ink layers. The set of opaque layers 330 is located above the reflective display 380. The set of opaque layers 330 may have multiple opaque layers, including a first opaque layer 332 and a second opaque layer 334. The set of opaque layers 330 eliminates an illumination of the white ink from below by absorbing recycled light. In one embodiment, a thickness of each of the opaque layers 332-334 is the same. For example, the thickness of each of the opaque layers 332-334 is approximately 5 μm+/−2 μm thick with a combined thickness of approximately 10 μm+/−4 μm thick. In another embodiment, the thickness of the opaque layers 332-334 varies. For example, the first opaque layers 332 has a first thickness of approximately 6 μm+/−2 μm and the second opaque layer 334 has a second thickness of 7 μm+/−2 μm. The number of layers in the white ink layers 320 and the opaque layers 330 is not intended to be limiting.

The set of white ink layers 320 is layered above the set of opaque layers 330. The set of white ink layers 320 may have multiple white ink layers, including a first white ink layer 322, a second white ink layer 324, a third white ink layer 326, and a fourth white ink layer 328. The set of white ink layers 320 may mask a color of the set of opaque layer 330 when viewed from a top side of the light guide 378. This helps to maintain an appearance of a white layer around a border of the reflective display 380. In one embodiment, each of the white ink layers, of the set of white ink layers 320, modifies an opacity level of the display. In another embodiment, the set of white ink layers 320 may increase a white opacity level of the display. The white opacity level of the display may refer to a whiteness level of a border region of the display surface that faces a user. For example, as a thickness of the set of white ink layers 320 increases the white opacity level increases, e.g., the display surface appears to be whiter. In another example, as a thickness of the set of white ink layers 320 decreases the white opacity level decreases, e.g., the display surface appears to be less white. The glass layer 310 is a top layer above the set of white ink layers 320, the set of opaque layers 330, and the reflective display 380. The glass layer 310 is a lens that may protect the set of white ink layers 320, the set of opaque layers 330, and the reflective display 380 from damage, water, dust, and so forth.

In one embodiment, a thickness of the white ink layers 322-328 may be the same. For example, each white ink layer 322-328 is approximately 5 micrometers (μm)+/−2 μm thick. In another embodiment, the thicknesses of the white ink layers 322-328 may vary. In one example the first and second white ink layers 322 and 324 may have a first thickness of approximately 5 μm+/−2 μm. The third and fourth white ink layers 326 and 328 may have a second thickness of 6 μm+/−2 μm.

The number of layers in the set of white ink layers 320 and the set of opaque layers 330 may range from a single white ink layer or opaque layer to multiple white or opaque layers. In one example, the set of white ink layers 320 and the set of opaque layers 330 may be approximately 35-40 μm thick. In another example, the number of white ink layers and opaque layers may be in view of a desired color viewable at the display assembly. For example, as the number of white ink layers increases or the number of opaque layers decreases, a surface of the display assembly 300 may appear to be whiter. In another example, as the number of white ink layers decreases or the number of opaque layers increases, the surface of the display assembly 300 may appear to be blacker or darker. In another example, the opaque layer may be screen-printed onto the display assembly. The screen-printed opaque layer may have pinholes where the black ink does not entirely cover the white ink layer, e.g., light leakage. In this example, multiple opaque layers may cover or fill in the pin holes to eliminate the light leakage. For example, a single black ink layer may have pinholes that cause bright spots on a lens. In this example, two black ink layers may be used to absorb the reflected light and reduce or eliminate the pinholes.

In one embodiment, the opaque layer 330 is more opaque than the white ink layer 320. In another embodiment, the set of white ink layers 320 and the set of opaque layers 330 are silk screened or printed onto a surface, such as the glass layer 310.

The white ink layers 322-328 and the opaque layers 332-334 may be offset from an inner edge 289 of a frame 288 by a defined distance (FIG. 2C). In another example, the white ink layers 322-328 and the opaque layers 332-334 may be offset from a second vertical plane along a second edge 342 of the bezel. The first edge 340 may be an outer edge of a bezel or the reflective display 380. In one embodiment, the second edge 342 of the reflective display may be an inner edge of a boundary of the reflective display 380 or an edge of a dead zone. In another embodiment, the reflective display 380 may extend the length of the set of white ink layers 320 or the length of the set of opaque layers 330. When the reflective display 380 extends the length of the set of white ink layers 320 or the length of the set of opaque layers 330, the display may have the dead zone for the portion of the reflective display 380 beneath the set of white ink layers 320 or the set of opaque layers 330. The dead zone may be a portion of the reflective display 380 where no information is displayed. In one example, the first white ink layer 322 is offset 0 millimeters (mm)+/−0.05 mm from the first edge 340 and 0.1 mm+/−0.05 mm from the second edge 342. In another example, the second white ink layer 324 is offset 0.05 millimeters (mm)+/−0.05 mm from the first edge 340 and 0.2 mm+/−0.05 mm from the second edge 342. In another example, the third white ink layer 326 is offset 0.1 mm+/−0.05 mm from the first edge 340 and 0.3 mm+/−0.05 mm from the second edge 342. In another example, the fourth white ink layer 328 is offset 0.15 millimeters (mm)+/−0.05 mm from the first edge 340 and 0.4 mm+/−0.05 mm from the second edge 342. In another example, the first opaque layer 332 is offset 0.2 millimeters (mm)+/−0.05 mm from the first edge 340 and 0.3 mm+/−0.05 mm from the second edge 342. In another example, the second opaque layer 334 is offset 0.25 millimeters (mm)+/−0.05 mm from the first edge 340 and 0.4 mm+/−0.05 mm from the second edge 342. The offset of the white ink layers 320 and the opaque layers 330 is not intended to be limiting. The offset of the white ink layers 320 and the opaque layers 330 may range from no offset to for one or more of the white ink layers 320 or the opaque layers 330 to varying offsets for one or more of the white ink layers 320 or the opaque layers 330.

Figure 4A:
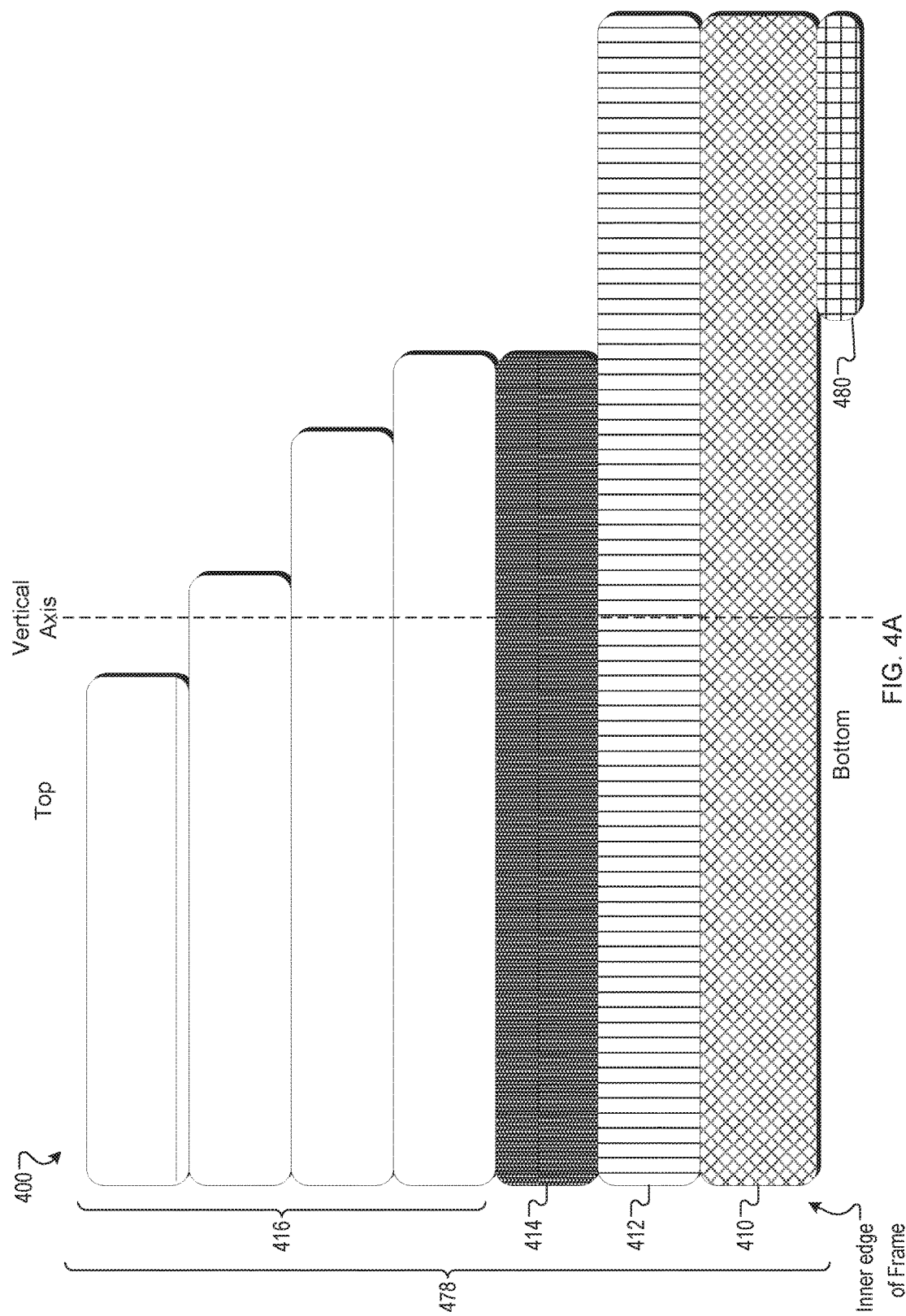
FIG. 4A illustrates a display assembly with a reflective display, a lens, an antiglare layer, a black ink layer, and a set of white ink layers according to one embodiment.

FIG. 4A illustrates a display assembly 400 with a reflective display 480, a lens 410, an antiglare layer 412, a black ink layer 414, and a set of white ink layers 416 according to one embodiment. The lens 410 is a bottom layer that is a lens that faces the reflective display 210 (FIG. 2A) and may protect the reflective display from damage, water, dust, and so forth. In one embodiment, the lens 410 is the bottom layer, the antiglare layer 412 is above the lens 410, the black ink layer 414 is above the antiglare layer 412, and the set of white ink layers 416 are above the black ink layer 414. In one embodiment, the set of white ink layers 416 mask a color of the black ink layer 414 from a surface of the light guide 478 facing a viewer to maintain an appearance of a white layer across a surface of the reflective display. In another embodiment, the white ink of the set of white ink layers may be thermoplastic ink, a thermoset ink, or a ceramic ink. For example, the ceramic ink may be sintered at high temperatures, such as approximately 500 degrees Celsius. One advantage of the ceramic ink is that the ceramic ink has a higher abrasion resistance than standard screen printing inks and may be cured at less than 200 degrees Celsius. In another embodiment, the black ink layer 414 eliminates an illumination of the white ink from below by absorbing recycled light.

The antiglare layer 412 may be a coating to cover the lens 410, the black ink layer 414, and/or the set of white ink layers 416 of the display assembly 400 to reduce the glare of the lens 410 across the display assembly 400. In one embodiment, the antiglare layer 412 is less than 100 µm thick. In one example, that antiglare layer 412 is an antiglare solution (Sol) gel that is approximately 200-400 nm thick. In another example, the antiglare layer 412 is an ultraviolet (UV) curable coating that is approximately 5-10 µm thick. In another embodiment, the antiglare layer 412 may be etched glass with defined roughness, haze, or gloss. In another embodiment, the black ink layer 414 and the set of white ink layers 416 may have a total combined thickness of approximately 35 µm+/−5 µm.

In one embodiment, a portion of the antiglare layer 412, beneath the black ink layer 414 and the white ink layers 416, may be etched down to make a surface of the display assembly 400 flush with the remainder of the antiglare layer 412. For example, the black ink layer 414 and the white ink layers 416 may be etched down by polishing the layers or using wet etching. In another embodiment, the white ink layers 416 may be reformulated to match a matte finish of the antiglare layer 412. For example, fillers may be added to the white ink to increase a roughness of the ink. In another embodiment, the white ink layers 416 may be reformulated to have a threshold abrasion resistance.

Figure 4B:
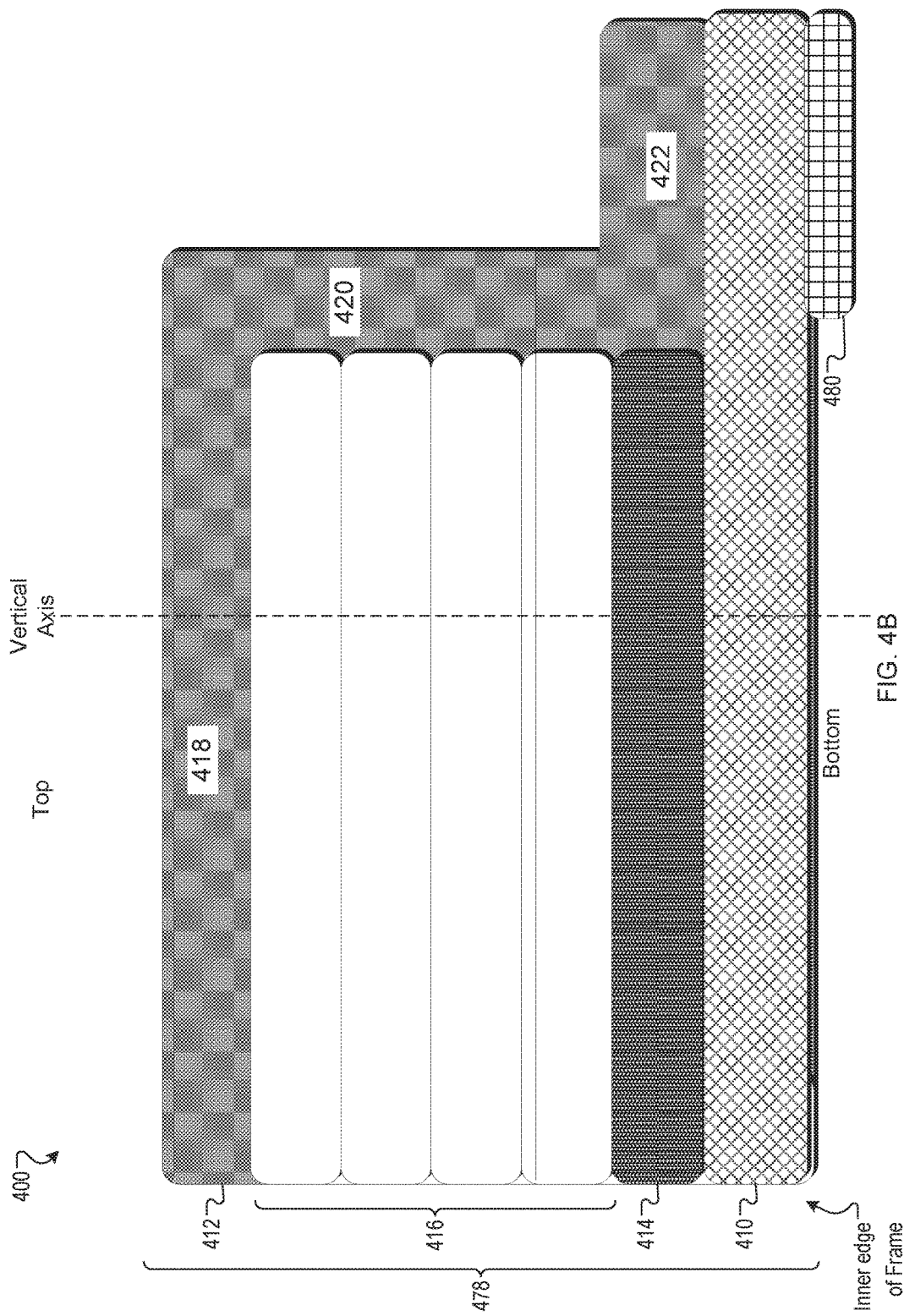
FIG. 4B illustrates a display assembly with a reflective display, a lens, a black ink layer, a set of white ink layers, and an antiglare layer according to one embodiment.

FIG. 4B illustrates a display assembly 400 with a reflective display 480, a lens 410, a black ink layer 414, a set of white ink layers 416, and an antiglare layer 412 according to one embodiment. The reference numbers in FIG. 4B may have the same numbers as in FIG. 4A to indicate the same or similar features or components as shown in FIG. 4A. However, the features or components of FIG. 4A are not intended to be limiting and other features or components may be used.

The antiglare layer 412 may be a coating to cover the lens 410, the black ink layer 414, and the set of white ink layers 416 of the display assembly 400 to reduce the glare of the lens 410 across the display assembly 400 and provide a protective layer. In one embodiment, the antiglare layer 412 may include a first antiglare portion 418, a second antiglare portion 420, and a third antiglare portion 422. The first antiglare portion 418 may be located above the set of white ink layers 416. The second antiglare portion 420 may abut against the black ink layer 414 and the set of white ink layers 416. The third antiglare portion 422 may be located above the lens 410.

FIG. 4C illustrates a display assembly 400 with a reflective display 480, a lens 410, an antiglare layer 412, a black ink layer 414, a set of white ink layers 416, and a planarization layer 424 (such as a polyimide substrate) according to one embodiment. The reference numbers in FIG. 4C may have the same numbers as in FIG. 4A to indicate the same or similar features or components as shown in FIG. 4A.

However, the features or components of FIG. 4A are not intended to be limiting and other features or components may be used.

In one embodiment, the planarization layer 424 may abut against the black ink layer 414 and the set of white ink layers 416. The planarization layer 424 may cover or planarize the full ink step to eliminate a rough or uneven top surface (e.g., an ink step). The antiglare layer 412 located above the planarization layer and the set of white ink layer 416 to cover the lens 410, the black ink layer 414, and/or the set of white ink layers 416 of the display assembly 400 and reduce the glare of the lens 410 across the display assembly 400.

FIG. 5 illustrates a display assembly 500 with a reflective display 580, a lens 510, a black ink layer 514, a set of white ink layers 516, and an antiglare layer 512 that covers the black ink layer 514 and the set of white ink layers 516 according to one embodiment. The lens 510 is a bottom layer that is a lens that faces the reflective display 210 (FIG. 2A) and may protect the reflective display from damage, water, dust, and so forth. In one embodiment, the lens 510 is the bottom layer, the black ink layer 514 is above the lens 410, and the set of white ink layers 516 is above the black ink layer 514. In one embodiment, the set of white ink layers 516 mask a color of the black ink layer 514 from a surface of the light guide 578 facing a viewer to maintain an appearance of a white layer across a surface of the reflective display. In another embodiment, the black ink layer 514 eliminates an illumination of the white ink by absorbing recycled light.

In another embodiment, the antiglare layer 512 may be a coating to cover or encapsulate the lens 510, the black ink layer 514, and the set of white ink layers 516 of the display assembly 500. For example, the antiglare layer 512 may include a first antiglare layer portion that is coplanar to the set of white ink layers 516 and a second antiglare layer portion that is located above the set of white ink layers 516.

The antiglare layer 512 may reduce the glare of the lens 510 across the display assembly 500. One advantage of the antiglare layer 512 covering the lens 510, the black ink layer 514, and the set of white ink layers 516 of the display assembly 500 to provide a smooth tactile feel by having a smooth and continuous top surface.

Figure 6:
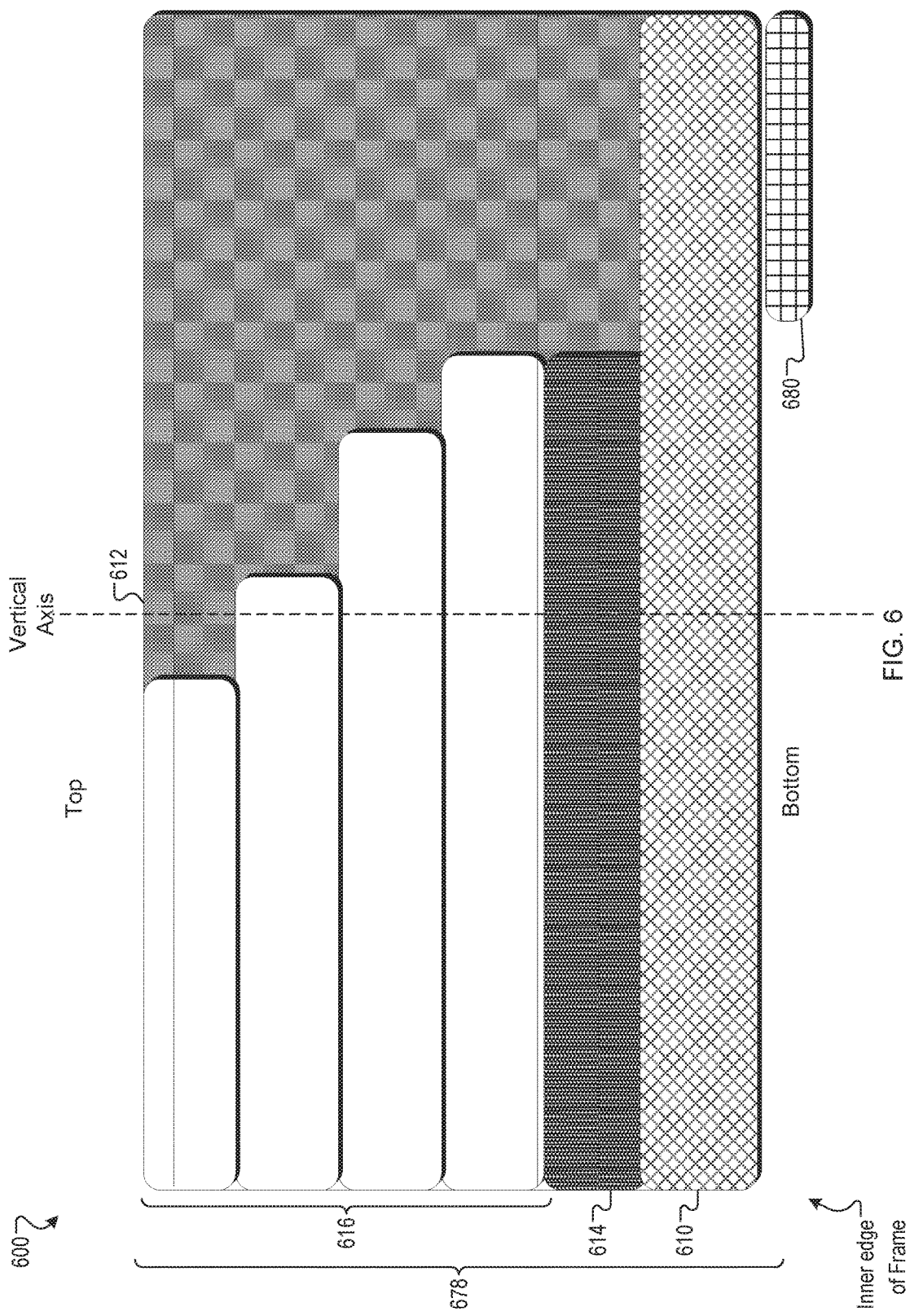
FIG. 6 illustrates a display assembly with a reflective display screen, a lens, a black ink layer, a set of white ink layers, and an antiglare layer according to one embodiment.

FIG. 6 illustrates a display assembly 600 with a reflective display 680, a lens 610, a black ink layer 614, a set of white ink layers 616, and an antiglare layer 612 according to one embodiment. The lens 610 is a bottom layer that is a lens that faces the reflective display 210 (FIG. 2A) and may protect the reflective display from damage, water, dust, and so forth. In one embodiment, the lens 610 is the bottom layer, the black ink layer 614 is above the lens 610, and the set of white ink layers 616 is above the black ink layer 614.

The antiglare layer 612 is above the lens 610 and abuts against to the black ink layer 614 and to the set of white ink layers 616. The antiglare layer 612 may be a coating to cover an active area of the display assembly 600. In one example, the active area is an area of a touchscreen display that may be touched by a user. In another example, the active area is an area of a display that is viewable to the user. In one embodiment, the set of white ink layers 616 mask a color of the black ink layer 614 from a surface of the light guide 678 facing a viewer to maintain an appearance of a white layer across a surface of the reflective display. In another embodiment, the black ink layer 614 eliminates an illumination of the white ink from below by absorbing recycled light. One advantage of the antiglare layer 612 abutting against the lens 610, the black ink layer 614, and the set of white ink layers 616 of the display assembly 600 to provide a smooth tactile feel by having a smooth and continuous top surface.

Figure 7A:
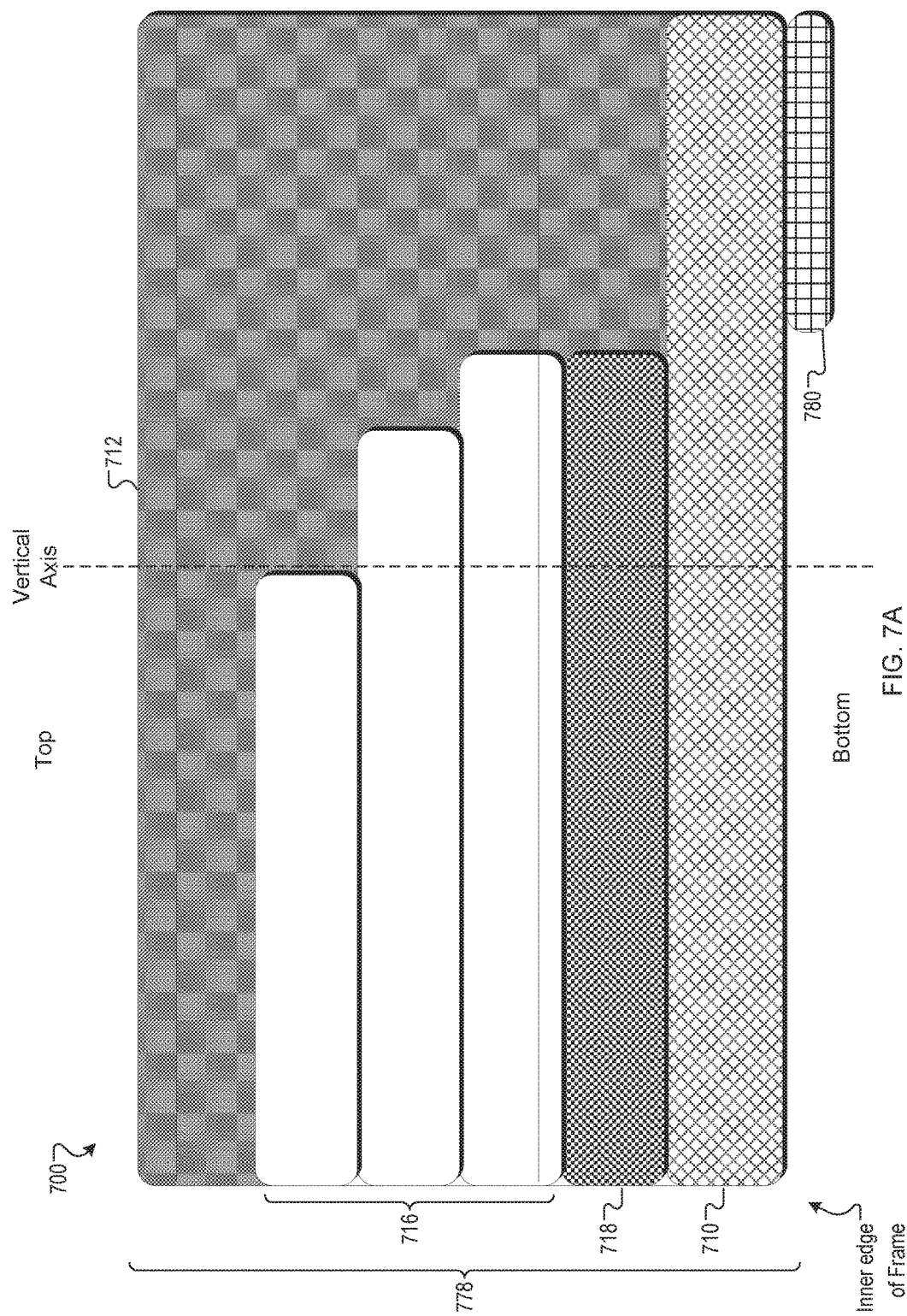
FIG. 7A illustrates a display assembly with a reflective display screen, a lens, an aluminum layer, a set of white ink layers, and an antiglare layer according to one embodiment.

FIG. 7A illustrates a display assembly 700 with a reflective display 780, a lens 710, an aluminum layer 718, a set of white ink layers 716, and an antiglare layer 712 according to one embodiment. The lens 710 is a bottom layer that is a lens that faces the reflective display 210 (FIG. 2A) and may protect the reflective display from damage, water, dust, and so forth. In one embodiment, the lens 710 is the bottom layer, the aluminum layer 718 is above the lens 710, and the set of white ink layers 716 is above the aluminum layer 718.

The antiglare layer 712 is above the lens 710 and may be a coating to cover the aluminum layer 718 and the set of white ink layers 716. In one embodiment, the aluminum layer 718 is less than 1 µm thick. In another embodiment, the aluminum layer 718 is approximately 0.1 µm thick. In one embodiment, the aluminum layer 718 eliminates an illumination of the white ink by absorbing recycled light from below. In another embodiment, the antiglare layer 712 may cover the lens 710, the aluminum layer 718, and a set of white ink layers 716 of the display assembly 700 to reduce the glare of the lens 710 across the display assembly 700. In one embodiment, the set of white ink layers 716 masks a color of the aluminum layer 718 from a surface of the light guide 778 facing a viewer to maintain an appearance of a white layer across a surface of the reflective display. One advantage of the antiglare layer 712 covering the lens 710, the black ink layer 714, and the set of white ink layers 716 of the display assembly 700 provides a smooth tactile feel by having a smooth and continuous top surface. Another advantage of the display assembly 700 with the aluminum layer 718 is that the aluminum layer 718 may be thinner than a black ink layer to reduce an overall thickness of the display assembly 700. For example, the aluminum layer 718 may be 50-100 nanometers (nm) thick. In another example, the aluminum is not as dark or black as the black ink layer, so a fewer number of white ink layers 716 may be used.

The aluminum layer may be applied to a non-active area of a display screen. The non-active area may be a non-touch sensitive portion of a touchscreen display or the non-active area may be a location on the display assembly that does not display anything. For example, the aluminum of the aluminum layer may be sputtered or evaporated aluminum on top the lens 710. The aluminum layer may be applied at one or more edges of a surface of the display assembly 700. When the aluminum layer is applied, the display screen may be masked or covered so that only the edges of the display screen may have an aluminum layer.

Figure 7B:
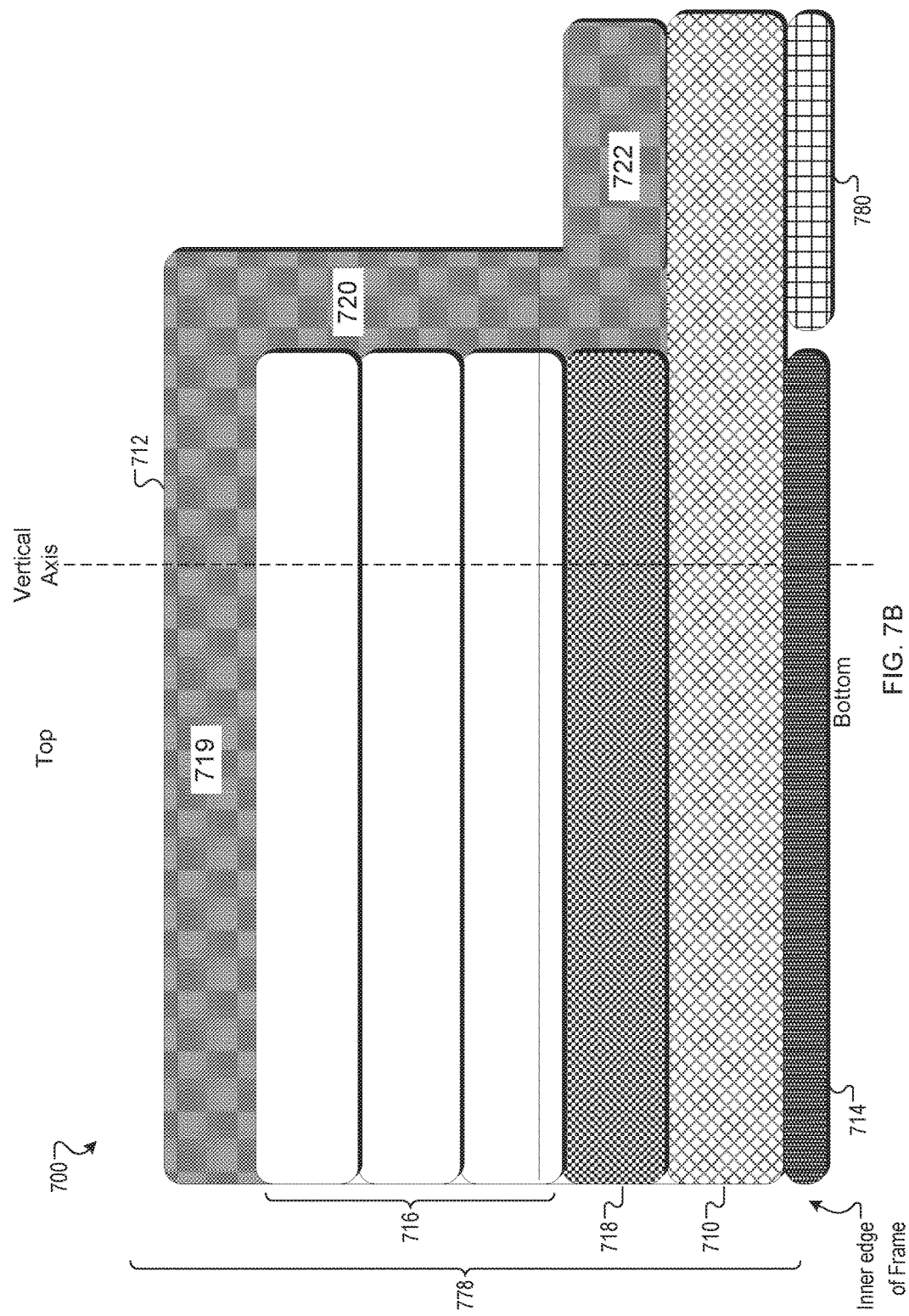
FIG. 7B illustrates a display assembly with a reflective display, a black ink layer, a lens, an aluminum layer, a set of white ink layers, and an antiglare layer according to one embodiment.

FIG. 7B illustrates a display assembly 700 with a reflective display 780, a black ink layer 714, a lens 710, an aluminum layer 718, a set of white ink layers 716, and an antiglare layer 712 according to one embodiment. The reference numbers in FIG. 7B may have the same numbers as in FIG. 7A to indicate the same or similar features or components as shown in FIG. 7A. However, the features or components of FIG. 7A are not intended to be limiting and other features or components may be used.

In one embodiment, the antiglare layer 712 may be a coating to cover the lens 710, the aluminum layer 718, and the set of white ink layers 716 of the display assembly 700 to reduce the glare of the lens 710 across the display assembly 700 and provide a protective layer. In one embodiment, the antiglare layer 712 may include a first antiglare portion 719 a second antiglare portion 720, and a third antiglare portion 722. The first antiglare portion 719 may be located above the set of white ink layers 716. The second antiglare portion 720 may abut against the aluminum layer 718 and the set of white ink layers 716. The third antiglare portion 722 may be located above the lens 710.

In one example, when the aluminum layer 718 is used to reflect light, the number of white ink layers in the set of white ink layers 716 may be decreased while still masking the color of the aluminum layer 718 because of an opacity level of the aluminum layer 718. When the number of white ink layers in the set of white ink layers 716 decreases below a threshold number of layers or a threshold thickness, a black layer 714 may be located below the lens 710 to absorb the reflected light and reduce or eliminate a glow portion of the reflective display 780.

Figure 7C:
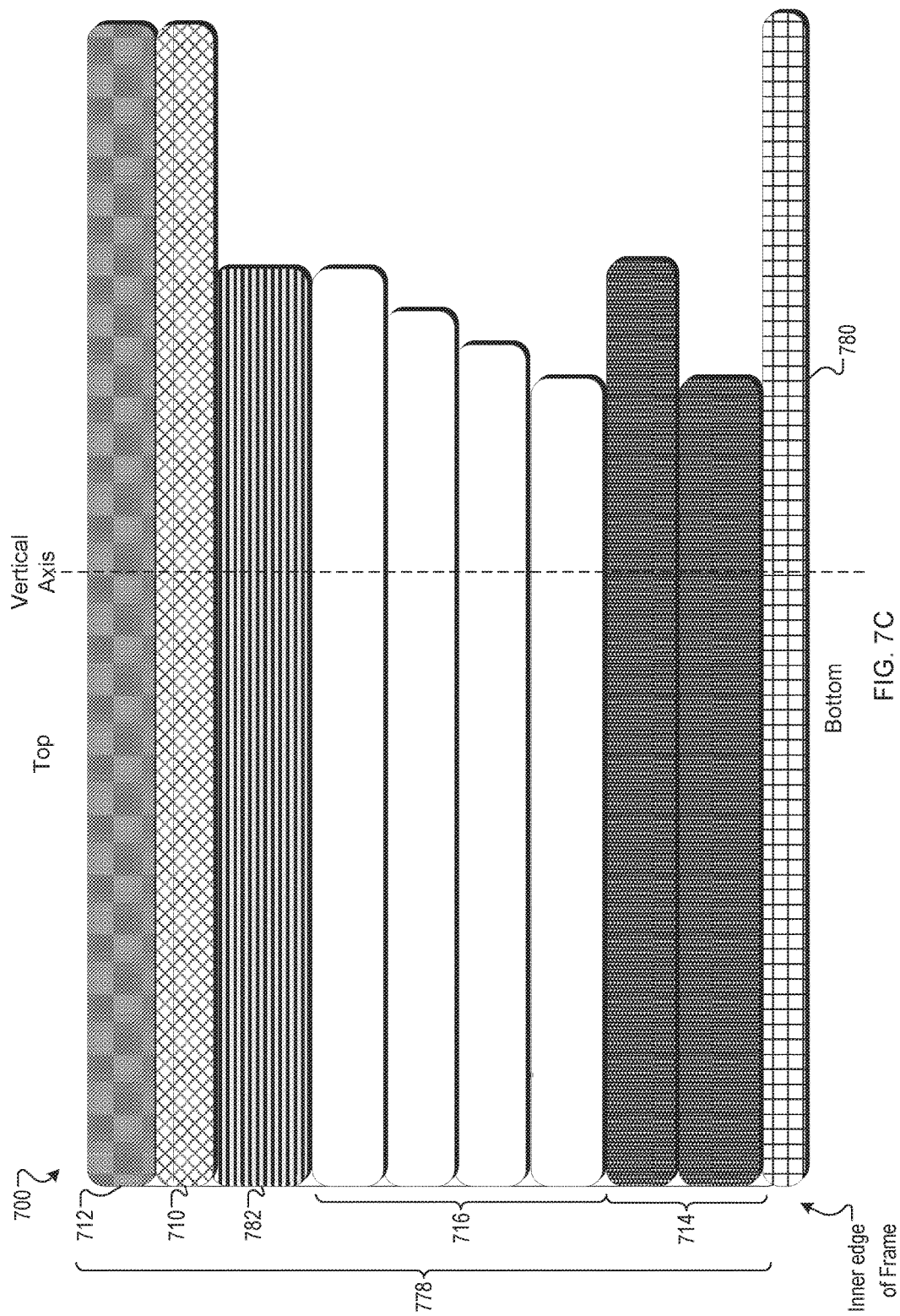
FIG. 7C illustrates a display assembly with a set of black ink layers, a set of white ink layers, a low refraction index layer, a lens, and an antiglare layer according to one embodiment.

FIG. 7C illustrates a display assembly 700 with a set of black ink layers 714, a set of white ink layers 716, a low refraction index layer 782, a lens 710, and an antiglare layer 712 according to one embodiment. The reference numbers in FIG. 7C may have the same numbers as in FIG. 7A to indicate the same or similar features or components as shown in FIG. 7A. However, the features or components of FIG. 7A are not intended to be limiting and other features or components may be used.

In one embodiment, the reflective display 780 may be a bottom layer of the display assembly 700. The set of black ink layers 714 may be disposed on the display 780. The set of black ink layers may absorb light that reflects off the reflective display 780. The set of white ink layers 716 may be disposed on the set of black ink layers 714. The low refraction index layer 782 may be disposed on the set of white ink layers 716. The lens 710 may be disposed on the low refraction index layer 782. The antiglare layer 712 may be disposed on the lens 710. In one embodiment, the low refraction index layer 782 may be a low refraction index material. In another embodiment, the refraction index of the low refraction index layer 782 may be approximately 1.000293 nm (e.g., approximately air). For example, the low refraction index layer 782 may be a low refraction index material with hollow spheres of glass filled with air. The hollow spheres may be hollow glass spheres with a thickness of 60 nm. In another example, the hollow spheres may be silica hollow spheres in a silicone or acrylic resin layer. In another example, the hollow spheres may be made using sol-gel processes. In another example, the hollow spheres are polystyrene hollow spheres and the set of black ink layers 714 and the set of white ink layers 716 are thermoplastic inks to eliminate or reduce the hollow spheres deforming during the thermal process and screen printing of the ink layers 714 and 716.

The index of refraction for the hollow spheres may be based on a density of the hollow spheres in an area, a size of the spheres, and a wall thickness of the hollow spheres. In one example, the low refraction index layer 782 may have a thickness of approximately 4-7 µm with the hollow spheres having a radius of approximately 2-3 um. The hollow glass spheres may have a hard level to avoid collapsing during screen printing and curing of the set of white ink layers 716. One advantage of the low refraction index layer 782 may be to enable the set of black ink layers 714 and the set of white ink layers 716 to be disposed below the lens 710 while avoiding a decreased abrasion resistance of the top surface of the display assembly 700. Another advantage of the low refraction index layer 782 may be to avoiding cosmetic defects of the set of black ink layers 714 and the set of white ink layers 716 caused by the lens 710.

Figure 8:
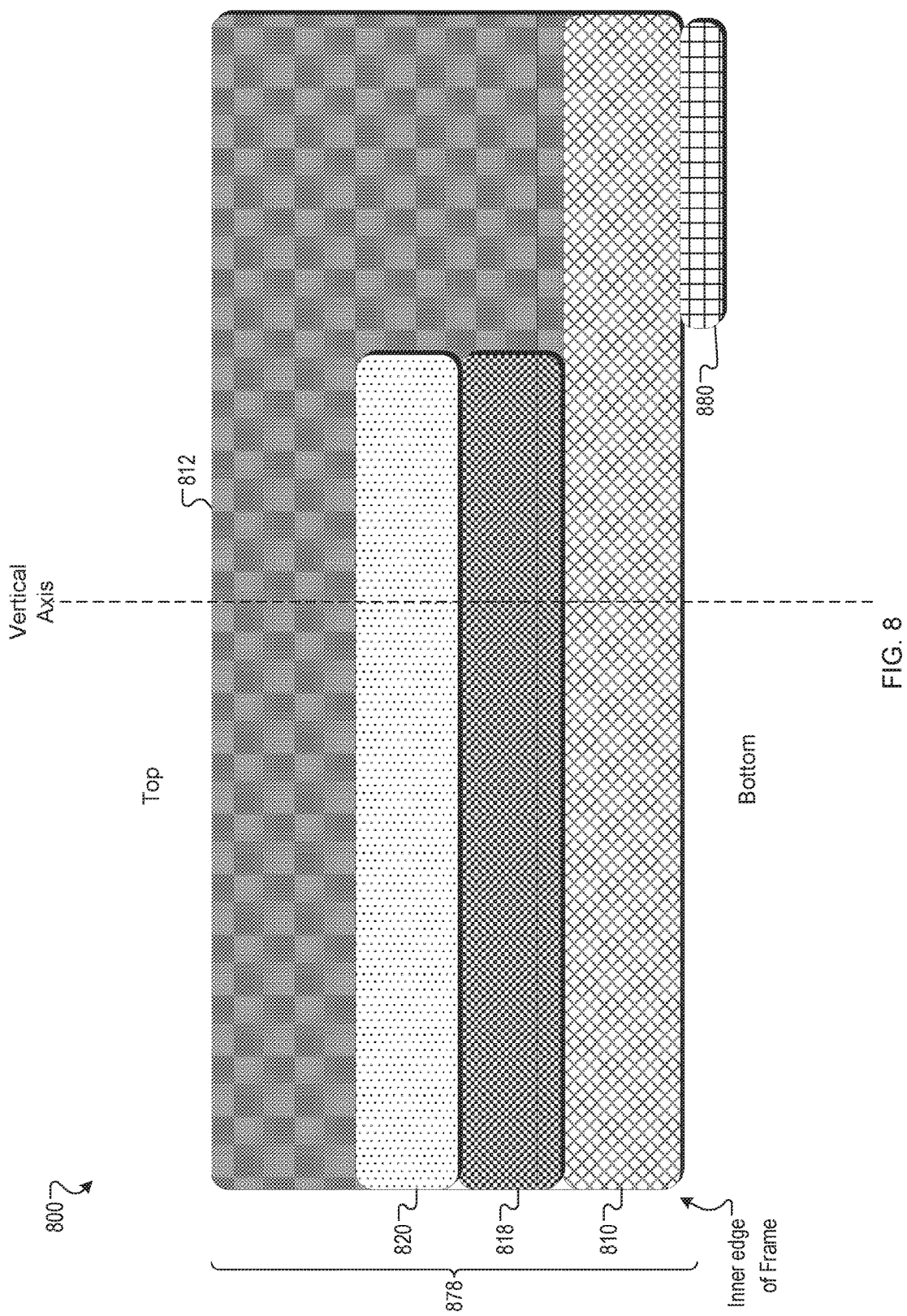
FIG. 8 illustrates a display assembly with a reflective display screen, a lens, an aluminum layer, a sputtered white layer, and an antiglare layer according to one embodiment.

FIG. 8 illustrates a display assembly 800 with a reflective display 880, a lens 810, an aluminum layer 818, a sputtered white layer 820, and an antiglare layer 812 according to one embodiment. The lens 810 is a bottom layer that is a lens that faces the reflective display 210 (FIG. 2A) and may protect the reflective display from damage, water, dust, and so forth. In one embodiment, the lens 810 is the bottom layer, the aluminum layer 818 is above the lens 810, and sputtered white layer 820 is above the aluminum layer 818.

The antiglare layer 812 is above the lens 810 and may be a coating to cover the aluminum layer 818 and the sputtered white layer 820. In one embodiment, the aluminum layer 818 eliminates an illumination of the white ink by absorbing recycled light from below. In one embodiment, the sputtered white layer 820 masks a color of the aluminum layer 818 from a surface of the light guide 878 facing a viewer to maintain an appearance of a white layer across a surface of the reflective display. In another embodiment, the set of sputtered white layers may increase a white opacity level of the display. In another embodiment, the sputtered white layer 820 may replace the white ink layer or set of white ink layers in FIGS. 3-7. The sputtered white layer 820 may be a magnesium oxide (MgO) layer, a zinc oxide (ZnO) layer, an aluminum oxide (Al2O3) layer, or a tin or stannic oxide (SnO2) layer.

In another embodiment, the antiglare layer 812 may cover the lens 810, the aluminum layer 818, and the sputtered white layer 820 of the display assembly 800 to reduce the glare of the lens 810 across the entire display assembly 800. One advantage of the antiglare layer 812 covering the lens 810, the aluminum layer 818, and the sputtered white layer 820 of the display assembly 800 is that the fully covered display assembly 800 provides a smooth tactile feel. Another advantage of the display assembly 800 with the aluminum layer 818 is that the aluminum layer 818 may be thinner than a black ink layer to reduce an overall thickness of the display assembly 800. Another advantage of the display assembly 800 with the sputtered white layer 820 is that the sputtered white layer 820 may be thinner than the set of white ink layers to reduce an overall thickness of the display assembly 800. For example, the sputtered white layer 820 is a thinner material than a set of white ink layers. In one embodiment, the sputtered white layer 820 may be less than 5 micrometers (µm) thick. In another embodiment, the sputtered white layer 820 has a thickness between approximately 100 nanometers (nm) and 1 micrometers (µm) thick. In another example, the sputtered white layer 820 has a different opacity to reduce a thickness and number of layers on the surface of the display assembly 800.

FIG. 9A illustrates a display assembly 900 with a reflective display 980, a lens or film 910, an optically clear adhesive (OCA) layer 924, a black ink layer 914, a set of white ink layers 916, a film 930, and an antiglare layer 912 according to one embodiment. The lens or film 910 is a bottom layer that is a lens that faces the reflective display 210 (FIG. 2A) and may protect the reflective display from damage, water, dust, and so forth. In one embodiment, the lens or film 910 is the bottom layer, the OCA layer 924 is above the lens or film 910, the black ink layer 914 is above the OCA layer 924, the set of white ink layers 916 is above the black ink layer 914, the film 930 is above the set of white ink layers 916, and the antiglare layer 912 is above the film 930.

The OCA layer 924 may include a first OCA portion 926 that is located between the lens or film 910 and the black ink layer 914. In another embodiment, the OCA layer 924 may include a second OCA portion 928 that abuts against the black ink layer 914, the set of white ink layers 916, and the first OCA portion 926. The second OCA portion 928 may be located between the lens or film 910 and the film 930. In another embodiment, the film 930 may be a thin glass layer or substrate, where the film 930 is approximately 50 µm to 100 um. In another embodiment, the film 930 is laminated with an antiglare layer or coating 912. The black ink layer 914 and set of white ink layers 916 may be located between the film 930 and the lens or film 910.

In one embodiment, the black ink layer 914 eliminates an illumination of the white ink by absorbing recycled light from below. In another embodiment, the set of white ink layers 916 masks a color of the black ink layer 914 from a surface of the light guide 978 facing a viewer to maintain an appearance of a white layer across a surface of the reflective display. In another embodiment, the film 930 may cover the black ink layer 914, the set of white ink layers 916, the OCA layer 924, and the lens or film 910 of the display assembly 900 to reduce the glare of the lens or film 910 across the display assembly 900. One advantage of the film 930 covering the black ink layer 914, the set of white ink layers 916, the OCA layer 924, and the lens or film 910 of the display assembly 900 to provide a smooth tactile feel by having a smooth and continuous top surface. Another advantage of the antiglare layer 912 being the top layer to provide a durable outer surface.

Figure 9B:
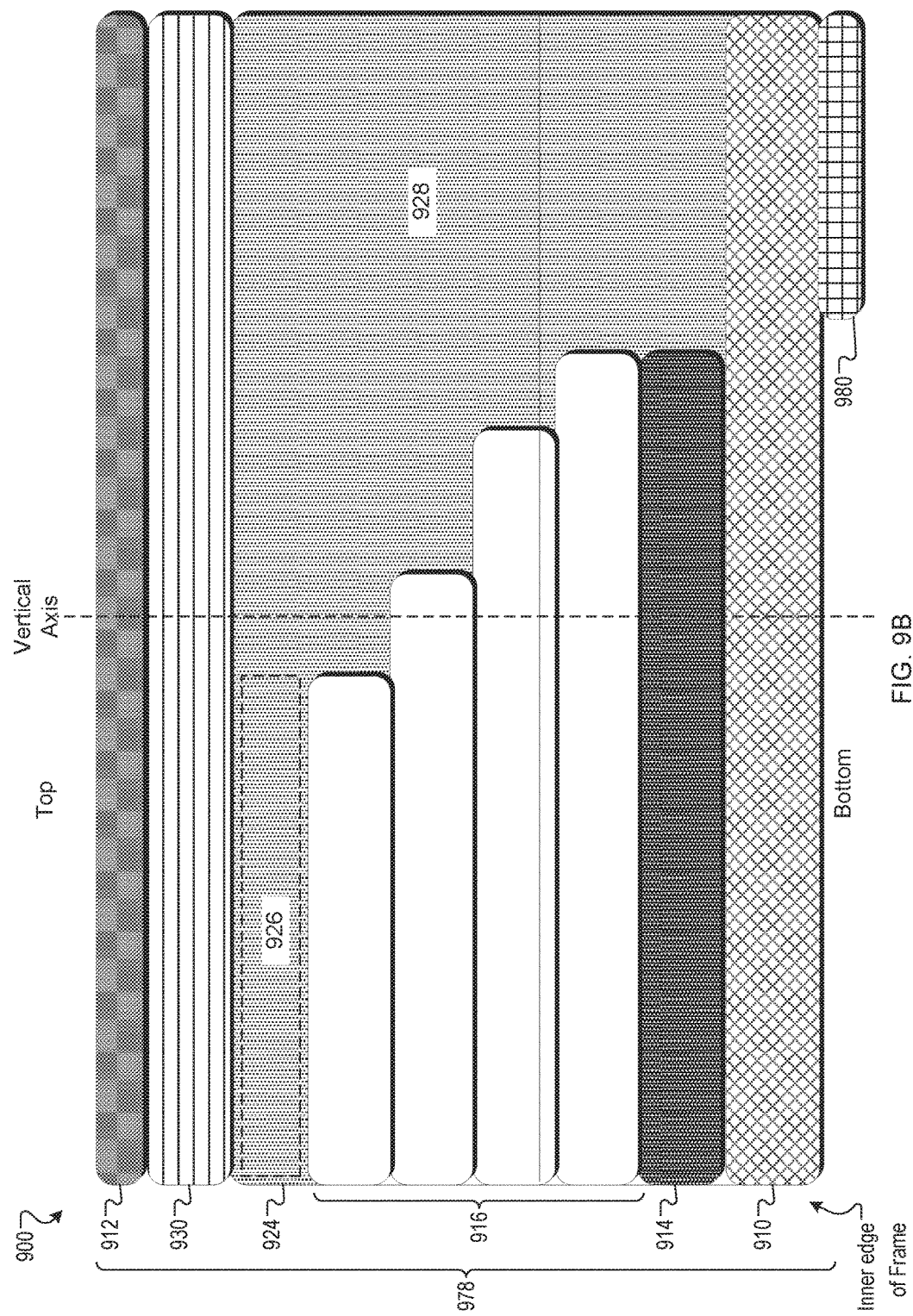
FIG. 9B illustrates a display assembly with a reflective display, a lens or film, an optically clear adhesive (OCA) layer, a black ink layer, a set of white ink layers, a film, and an antiglare layer according to one embodiment.

FIG. 9B illustrates a display assembly 900 with a reflective display 980, a lens or film 910, an optically clear adhesive (OCA) layer 924, a black ink layer 914, a set of white ink layers 916, a film 930, and an antiglare layer 912 according to one embodiment. The reference numbers in FIG. 9B may have the same numbers as in FIG. 9A to indicate the same or similar features or components as shown in FIG. 9A. However, the features or components of FIG. 9A are not intended to be limiting and other features or components may be used.

The OCA layer 924 may include a first OCA portion 926 that is located between the film 930 and the set of white ink layers 916. In another embodiment, the OCA layer 924 may include a second OCA portion 928 that abuts against the black ink layer 914, the set of white ink layers 916, and the first OCA portion 926. The second OCA portion 928 may be located between the lens or film 910 and the film 930.

FIG. 10 illustrates a display assembly 1000 with a reflective display 1080, an antiglare layer 1014, a lens 1010, a set of white ink layers 1016, a set of first black ink layers 1030, and a second black ink layer 1032 according to one embodiment. The antiglare layer 1014 is a top layer that is an antiglare layer 1014 that faces the reflective display 1080 and may protect the reflective display 1080 from damage, water, dust, and so forth. In one embodiment, reflective display 1080 is the bottom layer. The set of first black ink layers 1030 abuts against one or more middle or bottom white ink layers of the set of white ink layers 1016. The set of first black ink layers 1030 may be below the bottom white ink layer of the set of white ink layers 1016. The second black ink layer 1032 is below the lens 1010 and abuts against a top white ink layer of the set of white ink layers 1016. The set of white ink layers 1016 is above the set of first black ink layers 1030 and adjacent the second black ink layer 1030. The lens 1010 is above set of white ink layers 1016 and the second black ink layer 1032. The antiglare layer 1014 is above the lens 1010.

In one embodiment, the first and second black ink layers 1030 and 1032 eliminate an illumination of the white ink by absorbing recycled light from below before the light reaches the set of white ink layers 1016. In another embodiment, the set of white ink layers 1016 masks a color of the set of first black ink layers 1030 and the second black ink layer 1032 from a surface of the light guide 1078 facing a viewer to maintain an appearance of a white layer across a surface of the reflective display.

Figure 11:
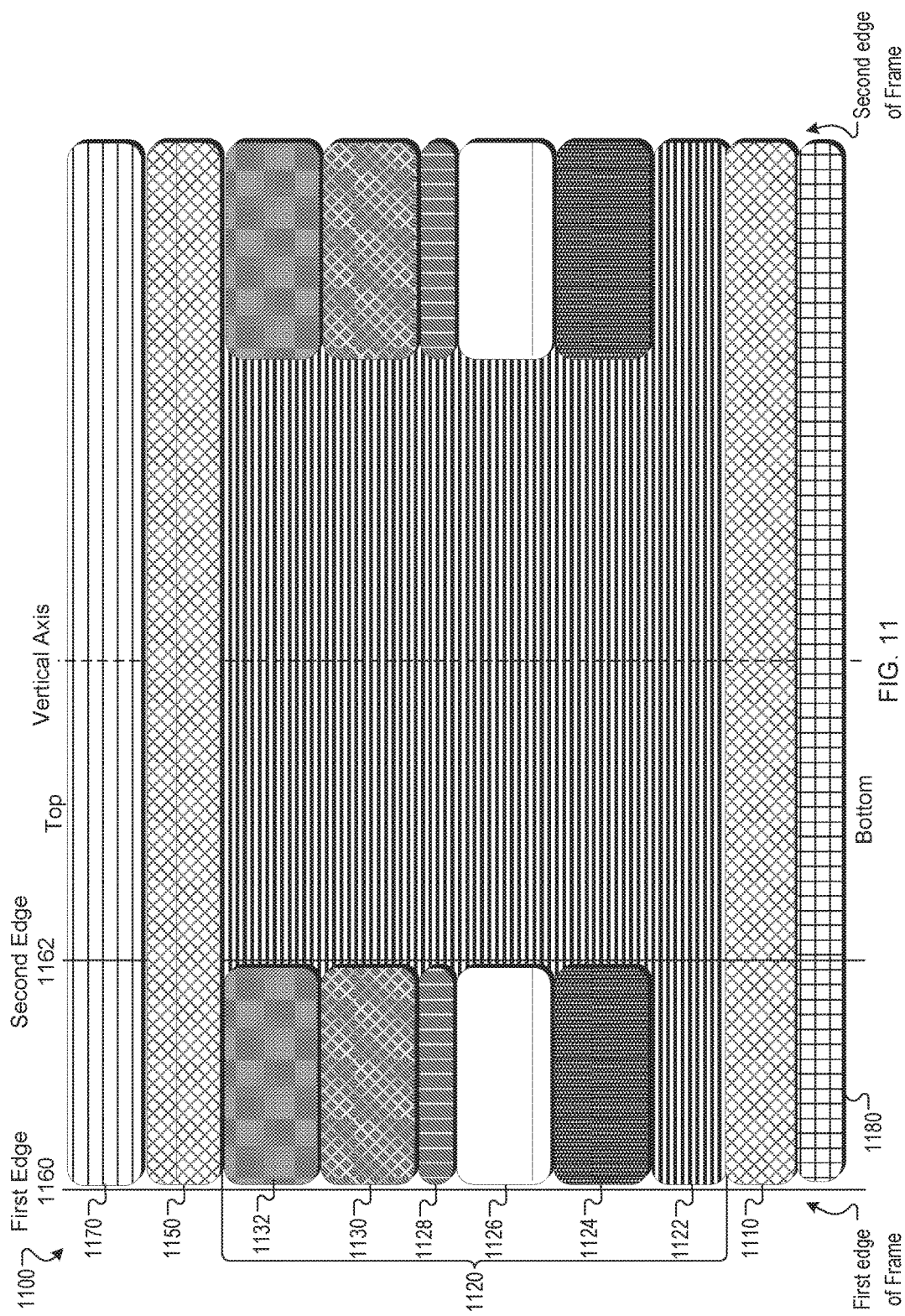
FIG. 11 illustrates a display assembly with a reflective display, an intervening layer, a multilayer structure, a lens, and an antiglare layer according to one embodiment

FIG. 11 illustrates a display assembly 1100 with a reflective display 1180, an intervening layer 1110, a multilayer structure 1120, a second lens 1150, and an antiglare layer 1170 according to one embodiment. In one embodiment, the multilayer structure 1120 may be disposed on the reflective display 1180. In another embodiment, the intervening layer 1110 may be disposed on the reflective display 1180 and the multilayer structure 1120 may be disposed on the intervening layer 1140.

The intervening layer 1110 may include a light guide, a touch sensor sub-layer, an adhesive sub-layer, or a combination thereof. In one example, the touch sensor sub-layer may be a glass layer, a plastic layer, or a film layer with one or more touch sensors integrated into it. In another example, the touch sensor sub-layer may be a glass layer, a plastic layer, or a film layer with a capacitive touch sensor grid integrated into it. In another example, the touch sensor sub-layer may be a glass layer, a plastic layer, or a film layer with a resistive touch sensor grid integrated into it.

In one example, the intervening layer 1110 may include the adhesive sub-layer disposed on the reflective display 1180, the light guide disposed on the adhesive sub-layer, and the touch sensor sub-layer disposed on the light guide. In another example, the intervening layer 1110 may include the adhesive sub-layer disposed on the reflective display 1180, the touch sensor disposed on the adhesive sub-layer, and the light guide disposed on the touch sensor sub-layer. In another example, the intervening layer 1110 may include the adhesive sub-layer disposed on the reflective display 1180 and the light guide disposed on the adhesive sub-layer. The layering and combination of the light guide, the touch sensor sub-layer, the adhesive sub-layer, and other sub-layers in the intervening layer 1110 are not intended to be limiting. The proceeding paragraphs provide examples of the layering and combinations in the intervening layer 1110.

In one example, the intervening layer 1110 or the lens 1150 may include: polycarbonate material; polymethyl methacrylate (PMMA) material; silicone material; glass material; film material; polyurethane hybrid material, or any combination thereof. In another example, the intervening layer 1110 or the lens 1150 may be glass material with an approximate 0.55 millimeters (mm) thickness. In another example, the intervening layer 1110 or the lens 1150 may be a plastic material with an approximate 0.5-0.6 mm thickness. In another example, the intervening layer 1110 or the lens 1150 may be film material with an approximate 0.188 µm thickness.

The multilayer structure 1120 may be disposed on the intervening layer 1110 or the reflective display 1180 and below the lens 1150. The multilayer structure 1120 may include: a first portion of a first optically clear adhesive (OCA) layer 1122; a second portion of the first OCA layer 1122, an opaque layer 1124, a white ink layer 1126, a first layer 1128; a polymer layer 1130; and a second OCA layer 1132.

The opaque layer 1124 may be a black ink layer. The white ink layer 1126 may include: magnesium oxide (MgO) material; zinc oxide (ZnO) material; aluminum oxide (Al2O3) material; stannic oxide (SnO2) material; polymer resin material with Titanium dioxide (TiO2) fillers, or any combination thereof. In another example, the first layer 1128 may include: nanoporous material, fluoropolymer material, silicone material with hollow silica fillers; fluoropolymer with hollow nanoparticles; polyurethane hybrid material, or any combination thereof. In another example, the polymer layer 1130 may include: polyethylene terephthalate (PET) material; cellulose triacetate (TAC) material; acrylic material; cyclic olefin polymer (COP) material; clear polyimide material; or any combination thereof. In another example, the second OCA layer 1132 may include: acrylic material; silicone material; polyurethane hybrid material, or any combination thereof. In one example, the lens 1150 may include: alkali-aluminosilicate glass material; soda lime glass material; polycarbonate material; polymethyl methacrylate (PMMA) material; co-extruded plastic material; or any combination thereof.

In another example, the first OCA layer 1122 may include: acrylic material; polyurethane material; silicone material; hybrid material; or a combination thereof. In another example, the opaque layer 1124 may include: magnesium oxide (MgO) material; zinc oxide (ZnO) material; aluminum oxide (Al2O3) material; stannic oxide (SnO2) material; or any combination thereof.

In one embodiment, a thickness of the intervening layer 1110 is approximately 100 µm to 750 µm thick. For example, the intervening layer 1110 may include a touch sensor that is approximately 50 µm to 250 µm thick and a light guide that is 50 µm to 500 µm thick In another embodiment, a thickness of the first portion of the first OCA layer 1122 is approximately 25 µm to 250 µm thick. In another embodiment, the opaque layer 1124 is approximately 5 µm to 15 µm thick. In another embodiment, the white ink layer 1126 is approximately 20 µm to 60 µm thick. In one example, a combined thickness of the opaque layer 1124 and the white ink layer 1126 is approximately 25 µm to 60 µm. For example, the white ink layer 1126 may include three to five white ink layers that are approximately 5 µm to 7 µm thick and the opaque layer 1124 can include one or two opaque ink layers that are approximately 5 µm to 7 µm thick. In another embodiment, the first layer 1128 is approximately 1 µm to 5 µm thick. In another embodiment, the polymer layer 1130 is approximately 7.5 µm to 100 µm thick. In another embodiment, the second OCA layer 1132 is approximately 10 µm thick or greater. In another embodiment, the second portion of the first OCA layer 1122 is approximately 25 µm to 250 µm thick. In another embodiment, the second lens 1150 may be glass that is approximately 0.55 mm to 1 mm thick. In another embodiment, the second lens 1150 may be a film that is approximately 23 µm to 188 µm thick.

As discussed above, the opaque layer 1124 may eliminate an illumination of the white ink 1126 from below by absorbing recycled light. In one embodiment, the opaque layer 1124 is more opaque than the white ink layer 1126. The white ink layer 1126 may mask a color of the opaque layer 1124 from a surface along the border of the display assembly 1100 facing a viewer. The mask may maintain an appearance of a white layer across a surface of the reflective display 1180, e.g., remove an appearance of a border with a different color. In one embodiment, the opaque layer 1124 may be a set of white ink layers. In another embodiment, the white ink layer 1126 may be a set of white ink layers, where each of the white ink layers in the set of white ink layers modifies a white opacity level of a border portion around the display. The white opacity level of the display may refer to a whiteness level of the border portion around the display surface that faces a user. In one embodiment, as a thickness or number of the white ink layers in the set of white ink layers increases the white opacity level increases, e.g., the display surface appears to be whiter. In another embodiment, a thickness or a number of white ink layers and the opaque layers may be in view of a desired color viewable at the display assembly 1100. For example, as the number of white ink layers increases or the number of opaque layers decreases, a surface of the display assembly 1100 may appear to be whiter. In another example, as the number of white ink layers decreases or the number of opaque layers increases, the surface of the display assembly 1100 may appear to be blacker or darker.

In another embodiment, the white ink layer 1126 and the opaque layer 1124 are silk screened or printed onto a surface, such as the first layer 1128. The screen-printed opaque layer may have pinholes where an opaque layer 1124 does not entirely cover the white ink layer 1126, e.g., light leakage. In this example, multiple opaque layers may cover or fill in the pin holes to eliminate the light leakage. For example, a single opaque layer 1124 may have pinholes that cause bright spots on a lens. In this example, two opaque layers 1124 may be used to absorb the reflected light and reduce or eliminate the pinholes.

The reflective display 1180 is the bottom layer of the display assembly 1100. The lens 1150 is a top layer of the display assembly 1100 above the multilayer structure 1120 and the reflective display 1180. The lens 1150 lens faces the reflective display 1180. The second lens 1150 may protect the reflective display 1180 and the multilayer structure 1120 from damage, water, dust, and so forth. The antiglare layer 1170 may be disposed on the lens 1150.

The light guide is located above the reflective display 1180. The intervening layer 1110 may be disposed on a light guide. The multilayer structure 1120 may be disposed above of the intervening layer 1110.

The first portion of the first OCA layer 1122 may be disposed on a portion of the intervening layer 1110 or the reflective display 1180. For example, the first portion of the first OCA layer 1122 may be disposed on a peripheral portion of the intervening layer 1110 or the reflective display 1180. The opaque layer 1124 may be disposed on the first portion of the first OCA layer 1122. The opaque layer 1124 may reflect light from the light guide to reduce an amount of light emitted around the border of the light guide. The white ink layer 1126 may be disposed on the opaque layer 1124 to mask a color of the opaque layer from a surface of the light guide. The first layer 1128 may be disposed on the white ink layer 1126.

The first layer 1128 may have an index of refraction. In one example, the first layer 1128 has a low index of refraction between 1 and 1.28. The polymer layer 1130 may be disposed on the first layer 1128. The second OCA layer 1132 may be disposed on the polymer layer 1130.

The first portion of the OCA layer 1122, the opaque layer 1124, the white layer 1126, the first layer 1128, the polymer layer 1130, and the second OCA layer 1132 may define a cavity. For example, the first portion of the OCA layer 1122, the opaque layer 1124, the white layer 1126, the first layer 1128, the polymer layer 1130, and the second OCA layer 1132 may be disposed around a border of the portion of the intervening layer 1110 or the reflective display 1180 between the first edge 1160 and the second edge 1162.

The second portion of the first OCA layer 1122 may be disposed adjacent and coplanar to the first portion of the OCA layer 1122, the opaque layer 1124, the white layer 1126, the first layer 1128, the polymer layer 1130, and the second OCA layer 1132. The second portion of the first OCA layer 1122 may fill the cavity. For example, the second portion of the first OCA layer 1122 may be disposed inside the border of the OCA layer 1122, the opaque layer 1124, the white layer 1126, the first layer 1128, the polymer layer 1130, and the second OCA layer 1132. The OCA layer 1122, the opaque layer 1124, the white layer 1126, the first layer 1128, the polymer layer 1130, and the second OCA layer 1132 may border around 4 edges of the reflective display 1180 and the second portion of the first OCA layer 1122 may be disposed within the border.

The layers 1124-1132 may be anchored to a one or more edges of a frame of the electronic device. The layers 1124-1132 of the first portion of the first OCA layer 1122 can be offset, by a defined distance, from a first edge 1160 of the frame of the electronic device surrounding the display assembly 1100. The first edge 1160 may be an outer edge of a bezel or the display assembly 1100. In one embodiment, the second edge 1162 of the display assembly may be an edge of a dead zone of the reflective display 1180. An edge of the intervening layer 1110, an edge of the multilayer structure 1120, an edge of the lens 1150, and an edge of the antiglare layer 1170 may be coplanar with the portion of the frame that partially encloses the display assembly 1100. The multilayer structure 1120 may also abut against an inner edge of a frame on a first side, a second side, a third side, and/or a fourth side of the electronic device. The multilayer structure 1120 may be located along the first side, the second side, the third side, and/or the fourth side of the electronic device to block reflective light from glowing along the edges of the reflective display 1180.

In another example, the layers 1124-1132 of the first portion of the first OCA layer 1122 can be offset from a vertical plane along an edge of a bezel of the reflective display 1180. In another embodiment, the reflective display 1180 may extend the length of the second portion of the first OCA layer 1122. When the reflective display 1180 extends the length of the second portion of the first OCA layer 1122, the reflective display 1180 may have a dead zone for a portion of the reflective display 1180 beneath the second portion of the first OCA layer 1122. The dead zone may be a portion of the reflective display where no information is displayed. The offset of the layers 1124-1132 of the multilayer structure 1120 is not intended to be limiting.

FIGS. 12A-12E illustrates the steps of a fabrication process to form the display assembly 1100 in FIG. 11 according to one embodiment. FIG. 12A illustrates a first step in the fabrication process of the display assembly 1100 in FIG. 11 according to one embodiment. In this step, a stack 1200 may include a first release film 1210 (such as a polyethylene terephthalate (PET) layer 1210), a polymer layer 1220, a first OCA layer 1230, and a second release film 1215 according to one embodiment. The first release film 1210 may be a bottom layer of the stack 1200. The polymer layer 1220 may be disposed on the first release film 1210. The first OCA layer 1230 may be disposed on the polymer layer 1220. The second release film 1215 may be disposed on the first OCA layer 1230. Each of the layers 1122-1132 of the multilayer structure 1120 may be single layers or multiple layers. The number of layers in the multilayer structure 1120 is not intended to be limiting.

FIG. 12B illustrates the next step in the fabrication process to form stack 1202 according to one embodiment. Some of the features in FIG. 12B are the same or similar to some of the features in FIG. 12A as noted by same reference numbers, unless expressly described otherwise. In this step, the first release film 1210 is removed to expose polymer layer 1220. A first layer 1240 is then deposited/formed on a bottom side of polymer layer 1220. The first layer 1240 may be formed using a physical vapor deposition (PVD) technique, a chemical vapor deposition (CVD) technique, a spin-on deposition coating technique, a spraying technique, a roll to roll (R2R) slit technique, and so forth. A white ink layer 1250 is then deposited/formed on a periphery of a bottom side of the first layer 1240. The white ink layer 1250 may be formed using a silk screening technique or an ink printing technique. An opaque layer 1260 is then deposited/ formed on a bottom side of the white ink layer 1250. The white ink layer 1250 may be formed using a silk screening technique or an ink printing technique. As discussed above, the white ink layer 1250 may be electrophoretic ink that is printed onto the first layer 1240. The opaque layer 1260 can be electrophoretic ink that is printed onto the white ink layer 1250. The first layer 1240, the white ink layer 1250, and the opaque layer 1260 may define a cavity 1264

FIG. 12C illustrates the next step in the fabrication process to form stack 1204 according to one embodiment. Some of the features in FIG. 12C are the same or similar to some of the features in FIGS. 12A and 12B as noted by same reference numbers, unless expressly described otherwise. In this step, a portion of the first layer 1240, the polymer layer 1220, and the first OCA layer 1230 are removed to expose a portion of the second release film 1215 and to define a cavity 1265. For example, a middle portion of the first layer 1240, the polymer layer 1220, and the first OCA layer 1230 are removed to leave a periphery portion of the first layer 1240, polymer layer 1220, and the first OCA layer 1230 along the periphery of the second release film 1215. The first layer 1240, polymer layer 1220, and the first OCA layer 1230 may be removed using a die cut technique or a laser cut technique.

A width of the cavity 1265 may correspond to a width of an active area of a display used to display information. For example, for a device with a display having an active region of approximately 6 inches in diagonal length, the cavity 1265 may have a width of approximately 6 inches. In another embodiment, the first layer 1240, the polymer layer 1220, and the first OCA layer 1230 may be die cut to align the first layer 1240, the polymer layer 1220, and the first OCA layer 1230 with the first opaque layer 1260, the second opaque layer 1262, the first white ink layer 1250, and the second white ink layer 1252.

FIG. 12D illustrates the next step in the fabrication process to form stack 1206 according to one embodiment. Some of the features in FIG. 12D are the same or similar to some of the features in FIGS. 12A, 12B, and 12C as noted by same reference numbers, unless expressly described otherwise.

In one embodiment, a second OCA layer 1270 may be deposited in the cavity 1265. For example, a second OCA layer 1270 may be a liquid OCA that fills the cavity 1265, is pre-cured, and laminated. The second OCA layer 1270 may include a first portion and a second portion. The second portion of the second OCA layer 1270 may be disposed in the cavity 1265 and adjacent to the first portion of the second OCA layer 1270, the opaque layer 1260, the white ink layer 1250, the first layer 1240, the polymer layer 1220, and the first OCA layer 1230. The second portion of the second OCA layer 1270 may be formed to fill the cavity 1265 by applying pressure to the second OCA layer 1270. For example, the pressure may cause the second portion of the second OCA layer 1270 to conform to the shape of the cavity 1265. The first portion of the second OCA layer 1270 may be disposed below the opaque layers 1260 and 1262. A third release film 1280 may be disposed below the second OCA layer 1270.

In another embodiment, In one embodiment, a second OCA layer 1270 may be deposited in the cavity 1264 in FIG. 1264. The second OCA layer 1270 may include a first portion and a second portion. The second portion of the second OCA layer 1270 may be disposed in the cavity 1264 and adjacent to the first portion of the second OCA layer 1270, the opaque layer 1260, and the white ink layer 1250. The second portion of the second OCA layer 1270 may be formed to fill the cavity 1264 by applying pressure to the second OCA layer 1270. For example, the pressure may cause the second portion of the second OCA layer 1270 to conform to the shape of the cavity 1264. The first portion of the second OCA layer 1270 may be disposed below the opaque layers 1260 and 1262. A third release film 1280 may be disposed below the second OCA layer 1270.

FIG. 12E illustrates the final step in the fabrication process to form stack 1208 according to one embodiment. Some of the features in FIG. 12E are the same or similar to some of the features in FIGS. 12A, 12B, 12C, and 12D as noted by same reference numbers, unless expressly described otherwise. In this step, the first release film 1215 and the third release film 1280 are removed from the stack 1206 in FIG. 12D or stack 1202 in FIG. 12B. An intermediate layer 1290 may be deposited below the second OCA layer 1270. A reflective display 1292 may be deposited below the intermediate layer 1290. The intermediate layer 1290 and the reflective display 1292 may be deposited using a lamination technique or an adhesive. A lens 1294 may be deposited above the first OCA layer 1230 and the second portion of the second OCA layer 1270. An antiglare layer 1296 may be deposited above the lens. The lens 1294 and the antiglare layer 1296 may be deposited using a lamination technique or an adhesive.

In one embodiment, stack 1208 may be laminated together using heat to form a composite layering of the reflective display 1292, the intervening layer 1290, the second OCA layer 1270, the opaque layer 1260, the white ink layer 1250, the first layer 1240, the polymer layer 1220, the first OCA layer 1230, the lens 1294, and the antiglare layer 1296. In one example, the stack 1208 may be heated to a temperature of at least 120 degrees Celsius so that the first layer 1240 may cure at a temperature of at least 120 degrees Celsius. In another example, the stack 1208 may be heated to different temperatures such as 150 degrees Celsius, 230 degrees Celsius, or 250 degrees Celsius in view of the materials used in the stack 1208 so that the first layer 1240 may cure.

Figure 13:
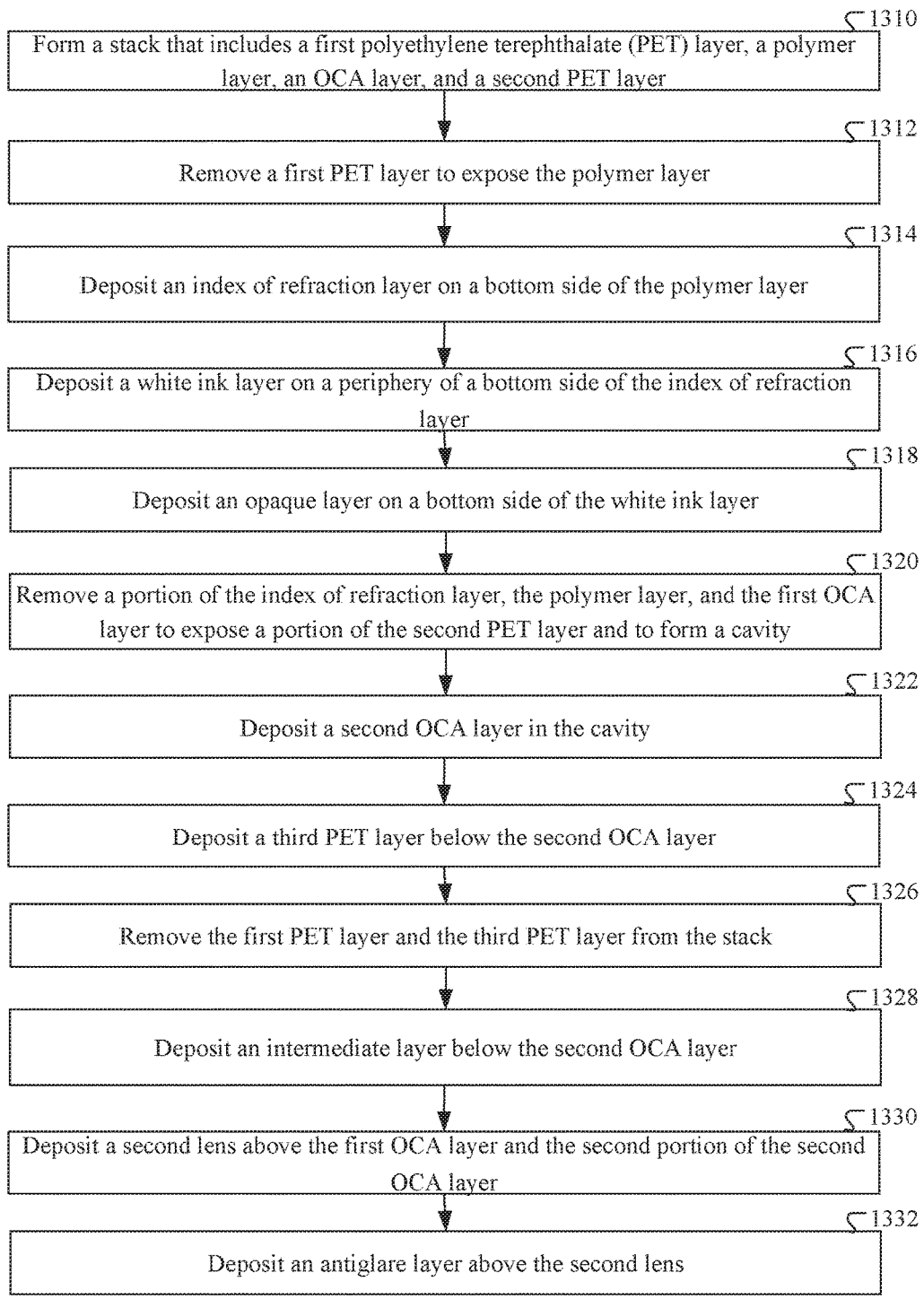
FIG. 13 depicts a flow diagram of one example of a fabrication process to form the display assembly according to one embodiment.

FIG. 13 depicts a flow diagram of one example of a fabrication process 1300 to form the display assembly 1100 in FIG. 11 according to one embodiment. The fabrication process may include forming a stack that includes a first polyethylene terephthalate (PET) layer, a polymer layer, an OCA layer, and a second release film (block 1310). The fabrication process may include removing a first release film to expose the polymer layer (block 1312). The fabrication process may include depositing an first layer on a bottom side of the polymer layer (block 1314). The fabrication process may include depositing a white ink layer on a periphery of a bottom side of the first layer (block 1316). The fabrication process may include depositing an opaque layer on a bottom side of the white ink layer (block 1318). The fabrication process may include removing a portion of the first layer, the polymer layer, and the first OCA layer to expose a portion of the second release film and to define a cavity (block 1320).

The fabrication process may include depositing a second OCA layer in the cavity (block 1322). The fabrication process may include depositing a third release film below the second OCA layer (block 1324). The fabrication process may include removing the first release film and the third release film from the stack (block 1326). The fabrication process may include depositing an intervening layer below the second OCA layer (block 1328). The fabrication process may include depositing a lens above the first OCA layer and the second portion of the second OCA layer (block 1330). The fabrication process may include depositing an antiglare layer above the lens (block 1332).

Figure 14:
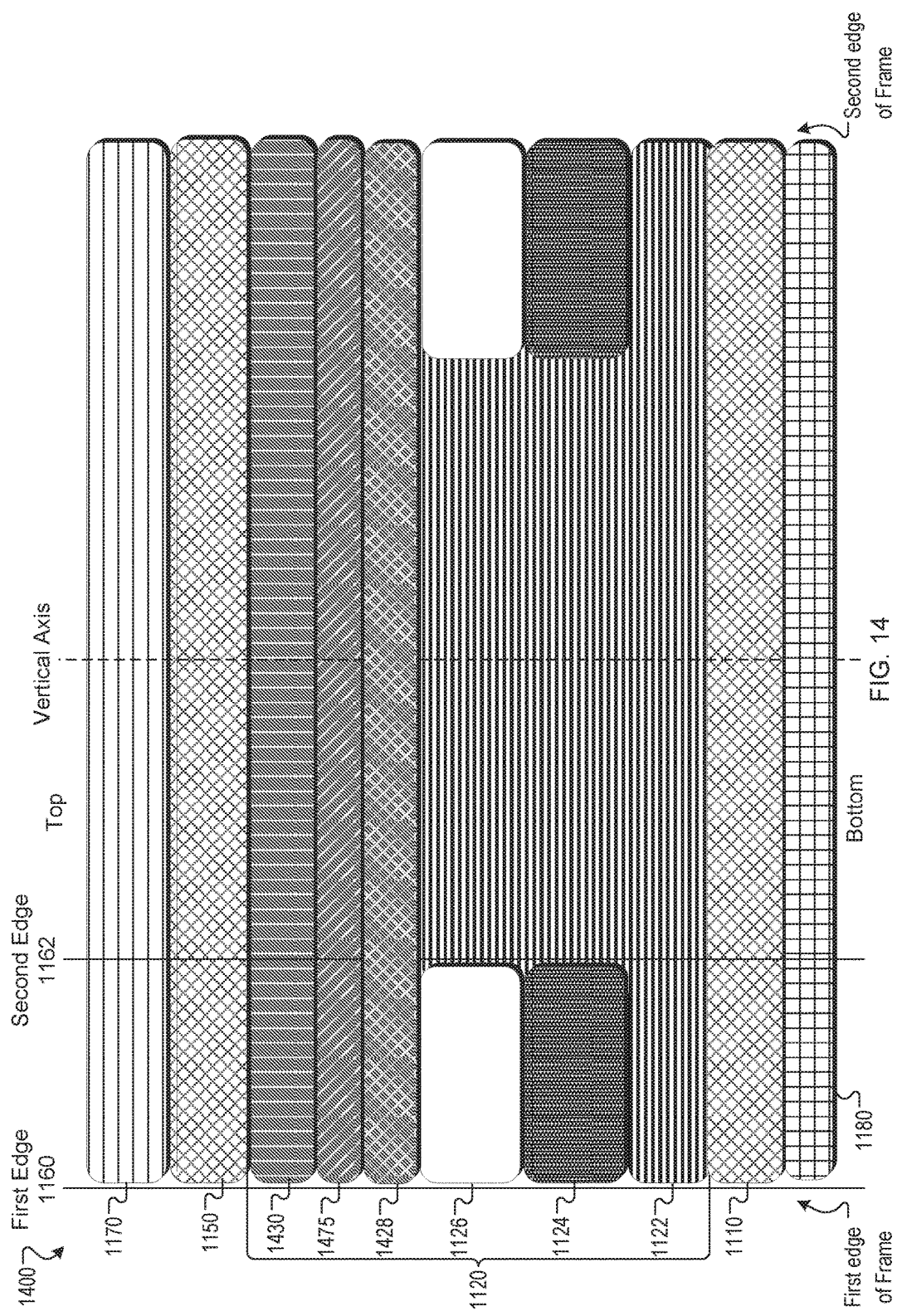
FIG. 14 illustrates a display assembly with a reflective display, an intervening layer, a multilayer structure, a lens, and an antiglare layer according to one embodiment.

FIG. 14 illustrates a display assembly 1400 with the reflective display 1180, the intervening layer 1110, the multilayer structure 1120, the lens 1150, the antiglare layer 1170, and an adhesive layer 1475 according to one embodiment. Some of the features in FIG. 14 are the same or similar to some of the features in FIG. 11 as noted by same reference numbers, unless expressly described otherwise.

The multilayer structure 1120 may include the first OCA layer 1122, the opaque layer 1124, the white layer 1126, an acrylic film 1428, an adhesive layer 1475, and the first layer 1430. The multilayer structure 1120 may include the first OCA layer 1122 may be disposed on the reflective display 1180 or the intervening layer 1110. The opaque layer 1124 may be disposed on the first portion of the first OCA layer 1122. The white layer 1126 may be disposed on the opaque layer 1124. The acrylic film 1428 may be disposed on the white ink layer 1126 and the second portion of the first OCA layer 1122. The adhesive layer 1475 may be disposed on the acrylic film 1428. In one embodiment, the first layer 1430 may be disposed on the adhesive layer 1475. In another embodiment, the first layer 1430 may be disposed on the lens 1150 to from a stack of the first layer 1430, the lens 1150, the antiglare layer 1170. The stack of the first layer 1430, the lens 1150, the antiglare layer 1170 may be laminated to the adhesive layer 1475.

The first portion of the OCA layer 1122, the opaque layer 1124, the white layer 1126, and the acrylic film 1428 may define a cavity. For example, the first portion of the OCA layer 1122, the opaque layer 1124, and the white layer 1126 may be disposed around a border of the intervening layer 1110 or the reflective display 1180 between the first edge 1160 and the second edge 1162.

The second portion of the first OCA layer 1122 may be disposed adjacent to the OCA layer 1122, the opaque layer 1124, and the white layer 1126 and below the acrylic film 1428. The second portion of the first OCA layer 1122 may fill the cavity. For example, the second portion of the first OCA layer 1122 may be disposed inside the border of the first portion of the first OCA 1122, the opaque layer 1124, and the white layer 1126. The first portion of the OCA layer 1122 may border around 4 edges of the reflective display 1180 and the second portion of the first OCA layer 1122 may be disposed within the border. The second portion of the first OCA layer 1122 may be coplanar with the first portion of the first OCA layer 1122, the opaque layer 1124, and the white layer 1126.

Figure 15:
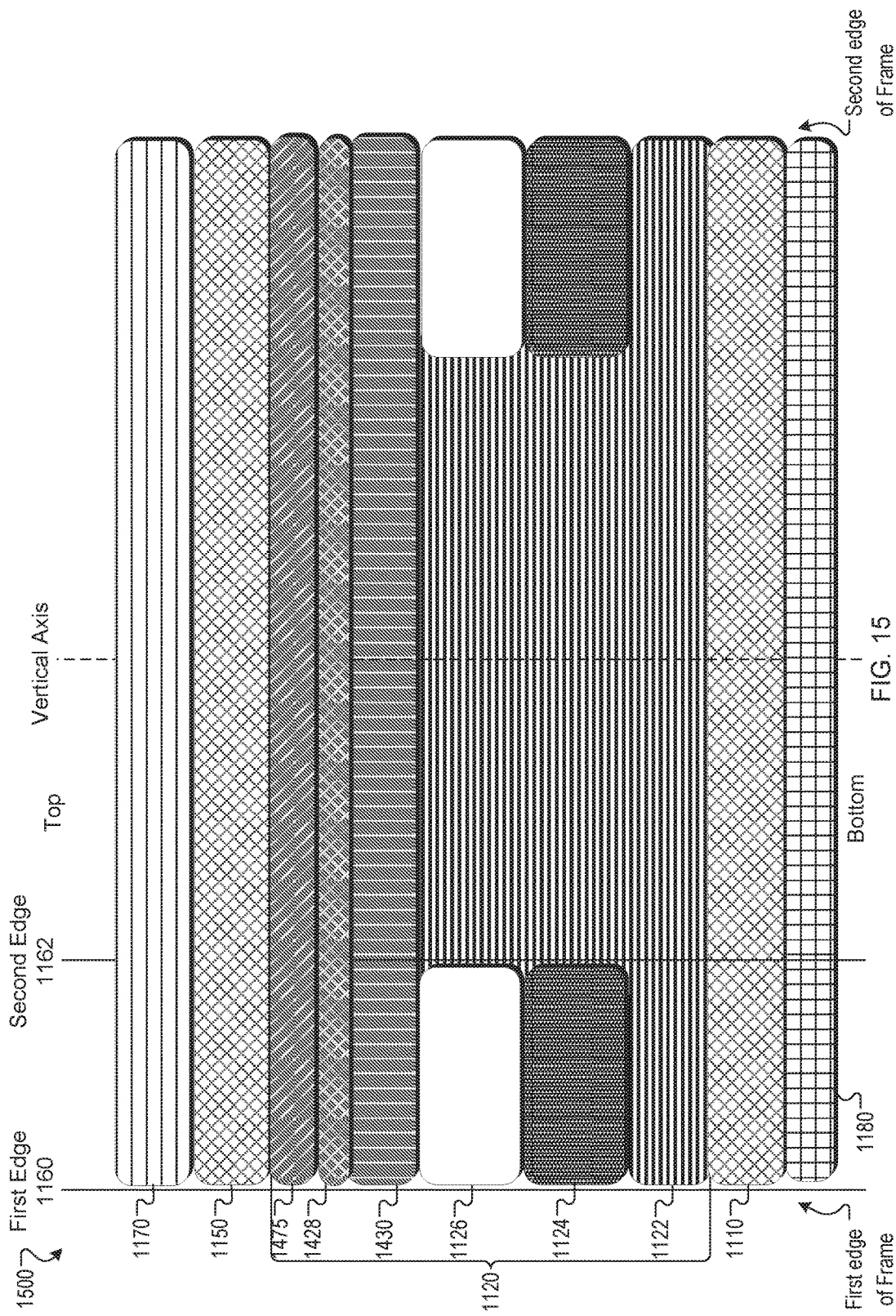
FIG. 15 illustrates a display assembly with a reflective display, an intervening layer, a multilayer structure, a lens, and an antiglare layer according to one embodiment.

FIG. 15 illustrates a display assembly 1500 with the reflective display 1180, the intervening layer 1110, the multilayer structure 1120, the lens 1150, and the antiglare layer 1170 according to one embodiment. Some of the features in FIG. 15 are the same or similar to some of the features in FIGS. 11 and 14 as noted by same reference numbers, unless expressly described otherwise.

The multilayer structure 1120 may include the first OCA layer 1122, the opaque layer 1124, the white layer 1126, the first layer 1430, the acrylic film 1428, and the adhesive layer 1475. The multilayer structure 1120 may include the first OCA layer 1122 may be disposed on the reflective display 1180 or the intervening layer 1110. The opaque layer 1124 may be disposed on the first portion of the first OCA layer 1122. The white layer 1126 may be disposed on the opaque layer 1124. The first layer 1430 may be disposed on the white ink layer 1126 and the second portion of the first OCA layer 1122. The acrylic film 1428 may be disposed on the first layer 1430. The adhesive layer 1475 may be disposed on the acrylic film 1428.

The first portion of the OCA layer 1122, the opaque layer 1124, the white layer 1126, and the first layer 1430 may define a cavity. For example, the first portion of the OCA layer 1122, the opaque layer 1124, and the white layer 1126 may be disposed around a border of the portion of the intervening layer 1110 or the reflective display 1180 between the first edge 1160 and the second edge 1162.

The second portion of the first OCA layer 1122 may be disposed adjacent to the OCA layer 1122, the opaque layer 1124, and the white layer 1126 and below the first layer 1430. The second portion of the first OCA layer 1122 may fill the cavity. For example, the second portion of the first OCA layer 1122 may be disposed inside the border of the first portion of the first OCA 1122, the opaque layer 1124, and the white layer 1126. The first portion of the OCA layer 1122 may border around 4 edges of the reflective display 1180 and the second portion of the first OCA layer 1122 may be disposed within the border. The second portion of the first OCA layer 1122 may be coplanar with the first portion of the first OCA layer 1122, the opaque layer 1124, and the white layer 1126.

Figure 16:
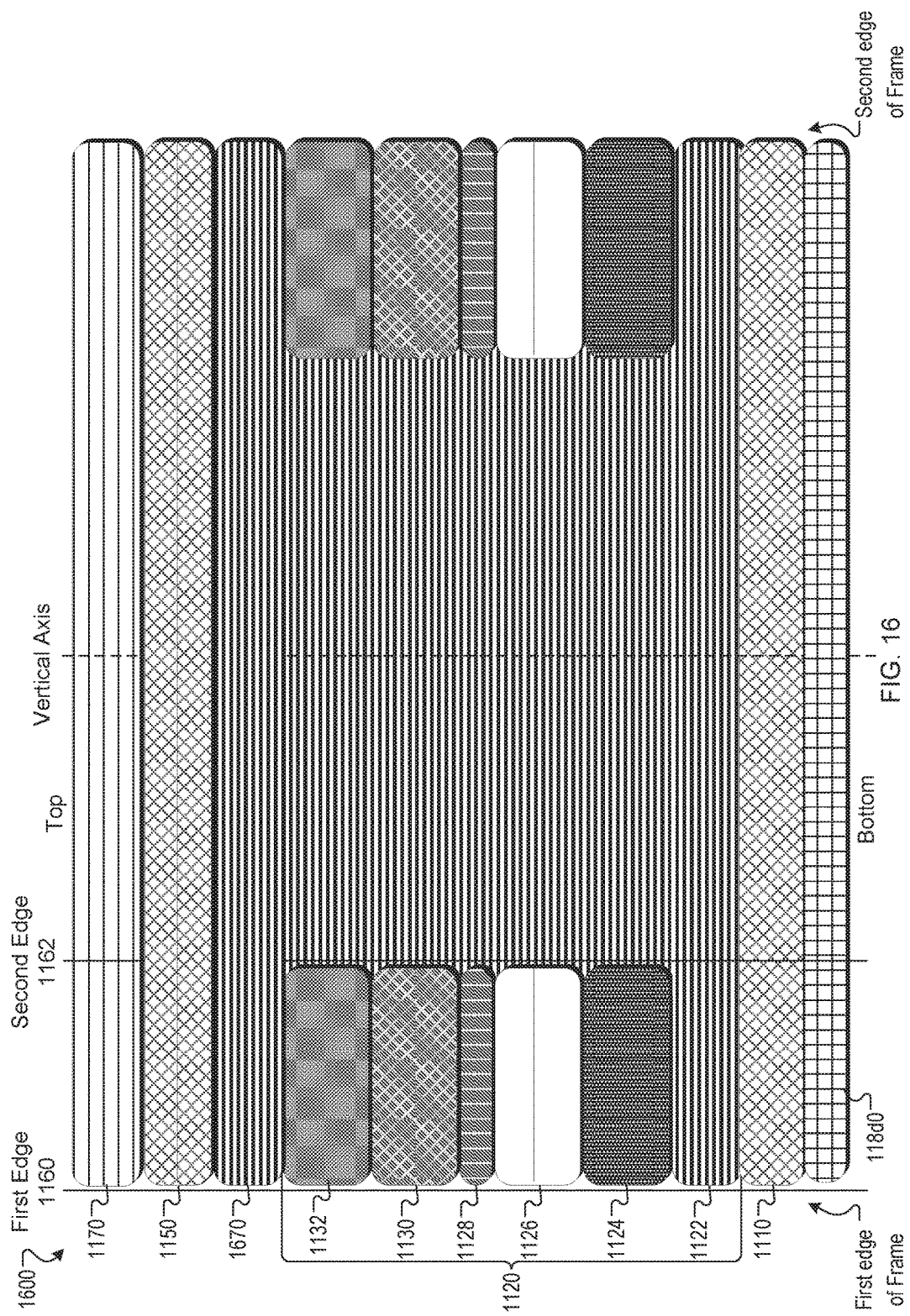
FIG. 16 illustrates a display assembly with a reflective display, an intervening layer, a multilayer structure, a lens, and an antiglare layer according to one embodiment

FIG. 16 illustrates a display assembly 1600 with the reflective display 1180, the intervening layer 1110, the multilayer structure 1120, the lens 1150, the antiglare layer 1170, and an ultraviolet (UV) layer 1670 according to one embodiment. Some of the features in FIG. 16 are the same or similar to some of the features in FIG. 11 as noted by same reference numbers, unless expressly described otherwise.

The multilayer structure 1120 may be disposed on the intervening layer 1110 or the reflective display 1180. In one embodiment, the UV layer 1670 may be disposed on the multilayer structure 1120. The lens 1150 may be disposed on the UV layer 1670. The antiglare layer 1170 may be disposed on the lens 1150. In another embodiment, the UV layer 1670 may be part of the multilayer structure 1120 and be disposed on the second OCA layer 1132 and adjacent to the second portion of the first OCA layer 1122. The lens 1150 may be disposed on the UV layer 1670 and the second portion of the first OCA layer 1122.

FIGS. 3-16 are not intended to be limiting. The various layers discussed in the preceding paragraphs may be located in a variety of orders or arrangements. The different types of layers discussed in the preceding paragraphs may also be included or excluded in the various display assemblies.

Figure 17:
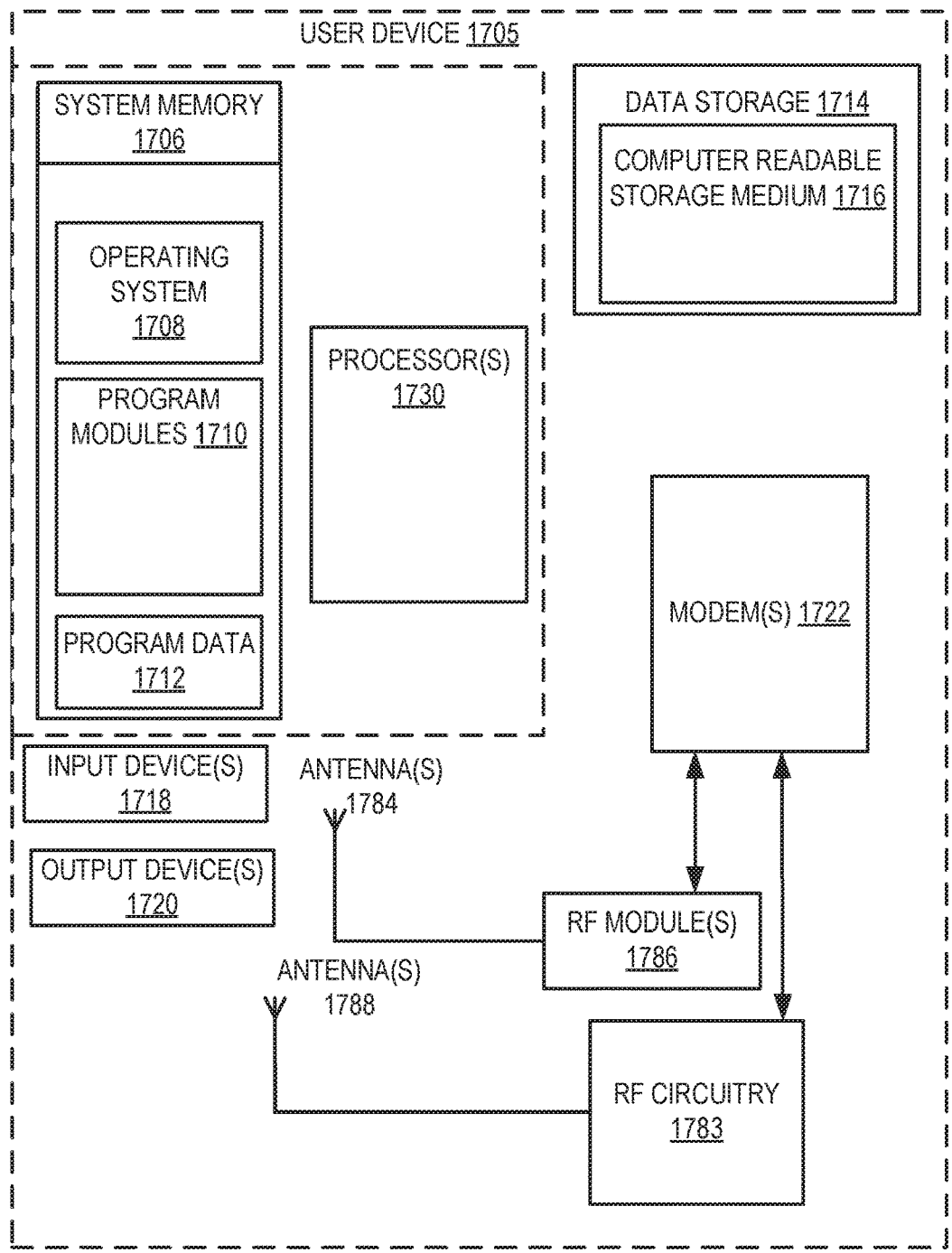
FIG. 17 is a block diagram of an electronic device in which embodiments of a radio device with an antenna structure may be implemented.

FIG. 17 is a block diagram of an electronic device 1705 in which embodiments of an antenna structure 1700 may be implemented. The electronic device 1705 may correspond to the electronic device 100 of FIG. 1. The electronic device 1705 may be any type of computing device such as an electronic book reader, a PDA, a mobile phone, a laptop computer, a portable media player, a tablet computer, a camera, a video camera, a netbook, a desktop computer, a gaming console, a DVD player, a Blu-ray®, a computing pad, a media center, a voice-based personal data assistant, and the like. The electronic device 1705 may be any portable or stationary electronic device. For example, the electronic device 1705 may be an intelligent voice control and speaker system. Alternatively, the electronic device 1705 may be any other device used in a WLAN network (e.g., Wi-Fi® network), a WAN network, or the like.

The electronic device 1705 includes one or more processor(s) 1730, such as one or more CPUs, microcontrollers, field programmable gate arrays, or other types of processors. The electronic device 1705 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of the methods as described herein. The electronic device 1705 performs functions by using the processor(s) 1730 to execute instructions provided by the system memory 1706.

The electronic device 1705 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 may reside, completely or at least partially, within the computer-readable storage medium 1716, system memory 1706 and/or within the processor(s) 1730 during execution thereof by the electronic device 1705, the system memory 1706 and the processor(s) 1730 also constituting computer-readable media. The electronic device 1705 may also include one or more input devices 1718 (keyboard, mouse device, specialized selection keys, etc.) and one or more output devices 1720 (displays, printers, audio output mechanisms, etc.).

The electronic device 1705 further includes a modem 1722 to allow the electronic device 1705 to communicate via a wireless network (e.g., such as provided by the wireless communication system) with other computing devices, such as remote computers, an item providing a system, and so forth. The modem 1722 may be connected to RF circuitry 1783 and zero or more RF modules 1786. The RF circuitry 1783 may be a WLAN module, a WAN module, PAN module, or the like. Antennas 1788 are coupled to the RF circuitry 1783, which is coupled to the modem 1722. Zero or more antennas 1784 may be coupled to one or more RF modules 1786, which are also connected to the modem 1722. The zero or more antennas 1784 may be GPS antennas, NFC antennas, other WAN antennas, WLAN or PAN antennas, or the like. The modem 1722 allows the electronic device 1705 to handle both voice and non-voice communications (such as communications for text messages, multimedia messages, media downloads, web browsing, etc.) with a wireless communication system. The modem 1722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE-Advanced (sometimes generally referred to as 4G), etc.

The modem 1722 may generate signals and send these signals to antenna 1788 and 1784 via RF circuitry 1783 and RF module(s) 1786 as described herein. Electronic device 1705 may additionally include a WLAN module, a GPS receiver, a PAN transceiver and/or other RF modules. These RF modules may additionally or alternatively be connected to one or more of antennas 1784, 1788. Antennas 1784, 1788 may be configured to transmit in different frequency bands and/or using different wireless communication protocols. The antennas 1784, 1788 may be directional, omnidirectional, or non-directional antennas. In addition to sending data, antennas 1784, 1788 may also receive data, which is sent to appropriate RF modules connected to the antennas.

In one embodiment, the electronic device 1705 establishes a first connection using a first wireless communication protocol, and a second connection using a different wireless communication protocol. The first wireless connection and the second wireless connection may be active concurrently, for example, if an electronic device is downloading a media item from a server (e.g., via the first connection) and transferring a file to another electronic device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1722 is shown to control transmission and reception via an antenna (1784, 1788), the electronic device 1705 may alternatively include multiple modems, each of which is configured to transmit/receive data via a different antenna and/or wireless transmission protocol.

The electronic device 1705 delivers and/or receives items, upgrades, and/or other information via the network. For example, the electronic device 1705 may download or receive items from an item providing the system. The item providing system receives various requests, instructions and other data from the electronic device 1705 via the network. The item providing system may include one or more machines (e.g., one or more server computer systems, routers, gateways, etc.) that have processing and storage capabilities to provide the above functionality. Communication between the item providing system and the electronic device 1705 may be enabled via any communication infrastructure. One example of such an infrastructure includes a combination of a wide area network (WAN) and wireless infrastructure, which allows a user to use the electronic device 1705 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots may be created by products using the Wi-Fi® technology based on IEEE 802.11x standards by Wi-Fi Alliance. Another of the wireless communication systems may be a wireless carrier system that may be implemented using various data processing equipment, communication towers, etc. Alternatively, or in addition, the wireless carrier system may rely on satellite technology to exchange information with the electronic device 1705.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 1705 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1705 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "ally inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a reflective display;
   a light guide, disposed on the reflective display, to propagate light from a light source toward the reflective display;
   the light source, adjacent to the light guide, to emit light towards the light guide; and
   a multilayer structure disposed on the light guide, the multilayer structure comprising:
      a first portion of a first optically clear adhesive (OCA) layer disposed on a peripheral portion of the light guide;
      a black ink layer disposed on the first portion of the first OCA layer, the black ink layer to reflect light from the reflective display to reduce an amount of light emitted around a border of the light guide;
      a white ink layer disposed on the black layer to mask a color of the black ink layer the border of the light guide;
      a first layer disposed on the white ink layer, the first layer having an index of refraction between 1 and 1.28;
      a polymer layer disposed on the first layer; and
      a second OCA layer disposed on the polymer layer, wherein the first portion of the first OCA layer, the black ink layer, the white ink layer, the first layer, the polymer layer, and the second OCA layer define a cavity; and
      a second portion of the first OCA layer disposed in the cavity and adjacent to the first portion of the first OCA layer, the black ink layer, the white ink layer, the first layer, the polymer layer, and the second OCA layer;
   a lens disposed on the multilayer structure; and
   an antiglare layer disposed on the lens.

2. The electronic device of claim 1, the first portion of the first OCA layer, the black ink layer, the white ink layer, the first layer, the polymer layer, and the second OCA layer are coplanar to the second portion of the first OCA layer.

3. The electronic device of claim 1, further comprising a frame that circumscribes the reflective display, wherein:
   an edge of the multilayer structure is adjacent to a portion of the frame, and
   the edge of the multilayer structure is coplanar to the portion of the frame.

4. A display comprising:
   a reflective display;
   a intervening layer disposed on a top side of the reflective display; and
   a multilayer structure disposed on a peripheral portion of the intervening layer, the multilayer structure comprising:
      a first portion of an optically clear adhesive (OCA) layer disposed on a peripheral portion of the intervening layer;
      a opaque layer disposed on the first OCA layer,
      a white ink layer disposed on the opaque layer;
      a first layer disposed on the white ink layer, the first layer having a first index of refraction;
      a polymer layer disposed on the first layer, wherein a refraction index value of the first layer is lower than a refraction index of the polymer layer; and
      a second OCA layer disposed on the polymer layer.

5. The display of claim 4, wherein the intervening layer comprises a light guide or a touchscreen sensor grid.

6. The display of claim 4, wherein the polymer layer, wherein the first portion of the first OCA layer, the opaque layer, the white ink layer, the polymer layer, and the second OCA layer are disposed around a border of the intervening layer.

7. The display of claim 4, further comprising:
   a lens disposed on the multilayer structure; and
   an antiglare layer disposed on the lens.

8. The display of claim 4, wherein opaque layer is a black ink layer or an aluminum layer and the white ink layer masks a color of the opaque layer from being visible.

9. The display of claim 4, wherein:
   the opaque layer comprises a plurality of black ink layers; and
   the white ink layer comprises a plurality of white ink layers, wherein each of the plurality of white ink layers modifies an opacity level of a border region of the reflective display.

10. The display of claim 4, further comprising a frame, wherein:
    an edge of the reflective display, an edge of the intervening layer, and an edge of the multilayer structure are adjacent to a portion of the frame that encloses a portion of the reflective display, and
    the edge of the reflective display, the edge of the intervening layer, and an edge of a light guide are coplanar to the portion of the frame that encloses the portion of the reflective display.

11. The display of claim 10, wherein an edge of the first OCA layer, an edge of the opaque layer, an edge of the white ink layer, an edge of the first layer, an edge of the polymer layer, or an edge of the second OCA layer is offset from an inner edge of the frame by a first distance.

12. The display of claim 4, wherein the white ink layer is approximately 100 nanometers (nm) to 1 micrometers (μm) thick.

13. The display of claim 4, wherein:
the intervening layer comprises alkali-aluminosilicate glass, soda lime glass, polycarbonate, polymethyl methacrylate (PMMA), or co-extruded plastic;
the first portion of the first OCA layer comprises acrylic or polyurethane;
the first layer comprises nanoporous material, fluoropolymer, or silicone with hollow silica fillers;
the polymer layer comprises polyethylene terephthalate (PET), cellulose triacetate (TAC), cyclic olefin polymer (COP), or acrylic;
the second OCA layer comprises acrylic or silicone;
the intervening layer comprises polycarbonate, PMMA, silicone, or glass;
the white ink layer comprises magnesium oxide (MgO), zinc oxide (ZnO), aluminum oxide (Al2O3), or stannic oxide (SnO2); and
the opaque layer comprises magnesium oxide (MgO), zinc oxide (ZnO), aluminum oxide (Al2O3), or stannic oxide (SnO2).

14. The display of claim 4, wherein the first layer has an index of refraction between 1 and 1.28.

15. An electronic device comprising:
a light guide disposed on a reflective display;
a multilayer structure disposed on a peripheral portion of the light guide, the multilayer structure comprising:
a first optically clear adhesive (OCA) layer disposed on the peripheral portion of the light guide;
a black ink layer disposed on the first OCA layer;
an first layer disposed on the black ink layer;
a polymer layer disposed on the first layer; and
a second OCA layer disposed on the polymer layer.

16. The electronic device of claim 15, wherein lens the first OCA layer, the black ink layer, the first layer, the polymer layer, and the second OCA layer are laminated together.

17. The electronic device of claim 15, further comprising:
a touchscreen layer disposed between the reflective display and the light guide; and
an antiglare layer disposed on an active area of the touchscreen layer.

18. The electronic device of claim 17, wherein the black ink layer is disposed on a first side the light guide and the touchscreen layer is disposed on a second side of the light guide, the first side being opposite the second side.

19. The electronic device of claim 17, wherein:
the reflective display is a borderless display, and
the first OCA layer, the black ink layer, the first layer, and the polymer layer are disposed on a dead zone portion of the reflective display where no information is displayed.

20. The electronic device of claim 15, further comprising a white ink layer disposed between the black ink layer and the polymer layer.

* * * * *